United States Patent
Steinmetz et al.

(10) Patent No.: US 9,393,894 B2
(45) Date of Patent: Jul. 19, 2016

(54) SIDE-BY-SIDE VEHICLE

(71) Applicant: Polaris Industries Inc., Medina, MN (US)

(72) Inventors: Gordon J. Steinmetz, Cottage Grove, MN (US); Daniel L. Goffman, Cocolalla, ID (US); Andy T. Ives, Harris, MN (US); Curtis C. Carruth, Maple Grove, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 14/289,429

(22) Filed: May 28, 2014

(65) Prior Publication Data

US 2014/0353956 A1    Dec. 4, 2014

Related U.S. Application Data

(60) Provisional application No. 61/829,434, filed on May 31, 2013.

(51) Int. Cl.
*B60R 21/13* (2006.01)
*B60N 3/06* (2006.01)
*B62D 21/18* (2006.01)
(Continued)

(52) U.S. Cl.
CPC *B60N 3/06* (2013.01); *B60N 2/012* (2013.01); *B60N 2/24* (2013.01); *B62D 21/183* (2013.01)

(58) Field of Classification Search
CPC ........ B60J 10/08; B60J 5/0487; B62D 21/183
USPC .............. 296/146.11, 37.8, 64, 75, 190.11, 296/190.03; 280/756
See application file for complete search history.

(56) References Cited

U.S. PATENT DOCUMENTS

| | | |
|---|---|---|
| 4,344,718 A | 8/1982 | Taylor |
| 6,293,617 B1 | 9/2001 | Sukegawa |

(Continued)

FOREIGN PATENT DOCUMENTS

| | | | |
|---|---|---|---|
| DE | 19949787 A1 | 4/2000 | |
| EP | 0568251 A1 | 11/1993 | |

(Continued)

OTHER PUBLICATIONS

International Search Report and Written Opinion issued by the European Patent Office, dated Sep. 9, 2014, for related International Application No. PCT/US2014/039824; 10 pages.

(Continued)

*Primary Examiner* — Pinel Romain
(74) *Attorney, Agent, or Firm* — Faegre Baker Daniels LLP

(57) ABSTRACT

A utility vehicle includes a plurality of ground engaging members and a frame supported by the plurality of ground engaging members. The frame assembly extends generally along a longitudinal axis of the utility vehicle. The utility vehicle further includes a front seating section coupled to the frame. The front seating section is configured to support an operator and a first passenger. Additionally, the utility vehicle includes a rear seating section coupled to the frame. The rear seating section is configured to support a second passenger and a third passenger. The rear seating section has an angled panel configured as a dead pedal for the second and third passengers, and a portion of the rear seating section extends forwardly into the front seating section.

12 Claims, 40 Drawing Sheets

(51) Int. Cl.
*B60N 2/01* (2006.01)
*B60N 2/24* (2006.01)

(56) References Cited

U.S. PATENT DOCUMENTS

| | | | |
|---|---|---|---|
| 7,597,385 B2 * | 10/2009 | Shibata | B60J 10/08 296/190.11 |
| 7,819,220 B2 | 10/2010 | Sunsdahl et al. | |
| 8,328,235 B2 | 12/2012 | Schneider et al. | |
| D691,924 S * | 10/2013 | Smith | D12/96 |
| 8,640,814 B2 | 2/2014 | Deckard et al. | |
| 2011/0298189 A1 | 12/2011 | Schneider et al. | |
| 2012/0073527 A1 | 3/2012 | Oltmans et al. | |
| 2012/0073537 A1 | 3/2012 | Oltmans et al. | |
| 2012/0161468 A1 * | 6/2012 | Tsumiyama | B60J 5/0487 296/146.11 |
| 2012/0212013 A1 | 8/2012 | Ripley et al. | |
| 2012/0217078 A1 | 8/2012 | Kinsman et al. | |
| 2012/0223500 A1 | 9/2012 | Kinsman et al. | |
| 2013/0033070 A1 * | 2/2013 | Kinsman | B62D 21/183 296/190.03 |
| 2014/0060954 A1 | 3/2014 | Smith et al. | |
| 2014/0062048 A1 | 3/2014 | Schlangen et al. | |
| 2014/0065936 A1 | 3/2014 | Smith et al. | |
| 2014/0067215 A1 | 3/2014 | Wetterlund et al. | |
| 2014/0109627 A1 | 4/2014 | Lee et al. | |

FOREIGN PATENT DOCUMENTS

| | | |
|---|---|---|
| EP | 2236395 A1 | 10/2010 |
| FR | 2936028 A1 | 3/2010 |
| WO | WO98/30430 | 7/1998 |
| WO | WO2010/148014 A1 | 12/2010 |
| WO | WO2012/040553 A2 | 3/2012 |
| WO | WO2012/109546 A1 | 8/2012 |
| WO | WO2012/174793 A1 | 12/2012 |
| WO | WO2013/166310 A1 | 11/2013 |
| WO | WO2014/039432 A2 | 3/2014 |
| WO | WO2014/039433 A2 | 3/2014 |
| WO | WO2014/059258 A1 | 4/2014 |

OTHER PUBLICATIONS

International Search Report and Written Opinion issued by the European Patent Office, dated Jul. 25, 2014, for related International Application No. PCT/US2014/028152; 21 pages.

* cited by examiner

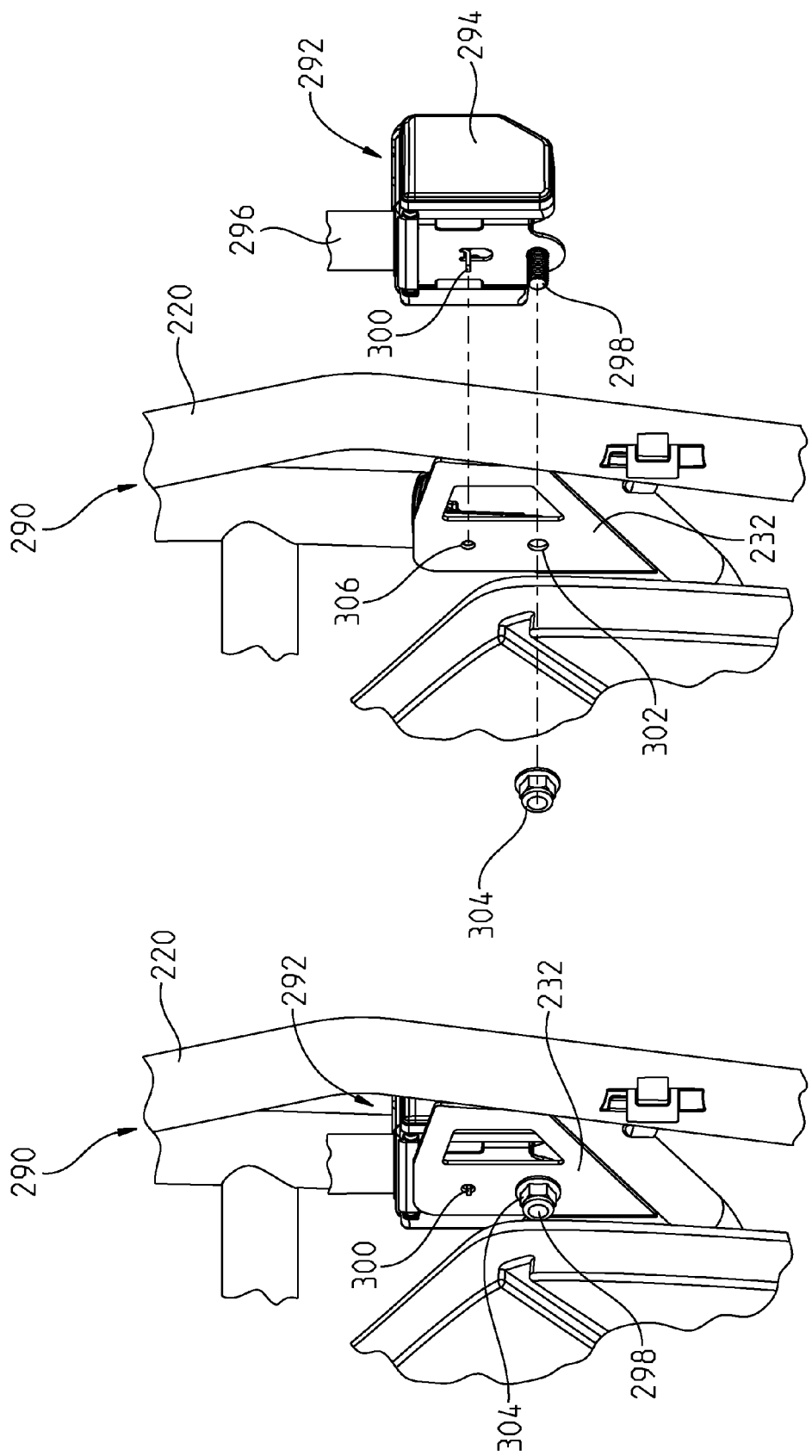

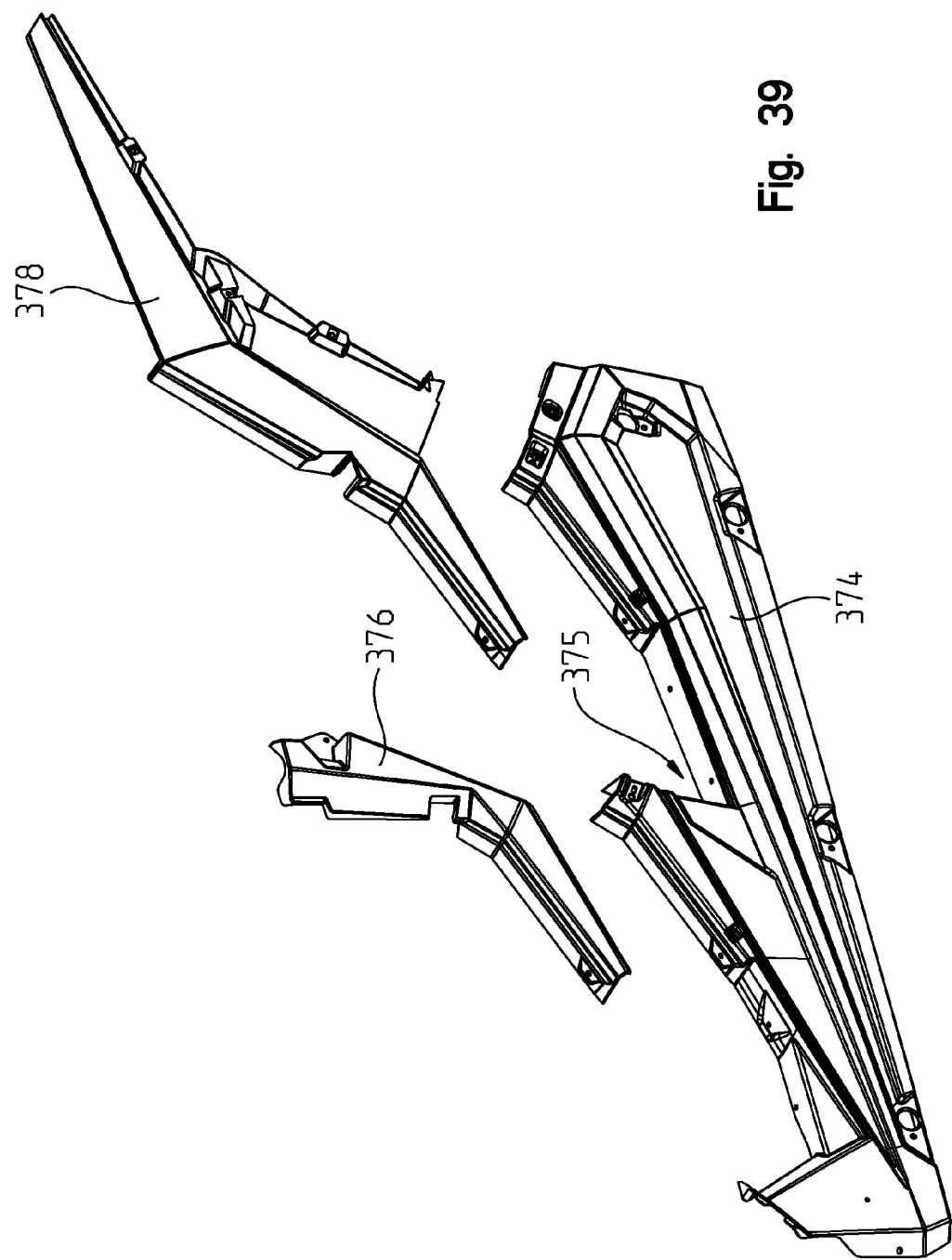

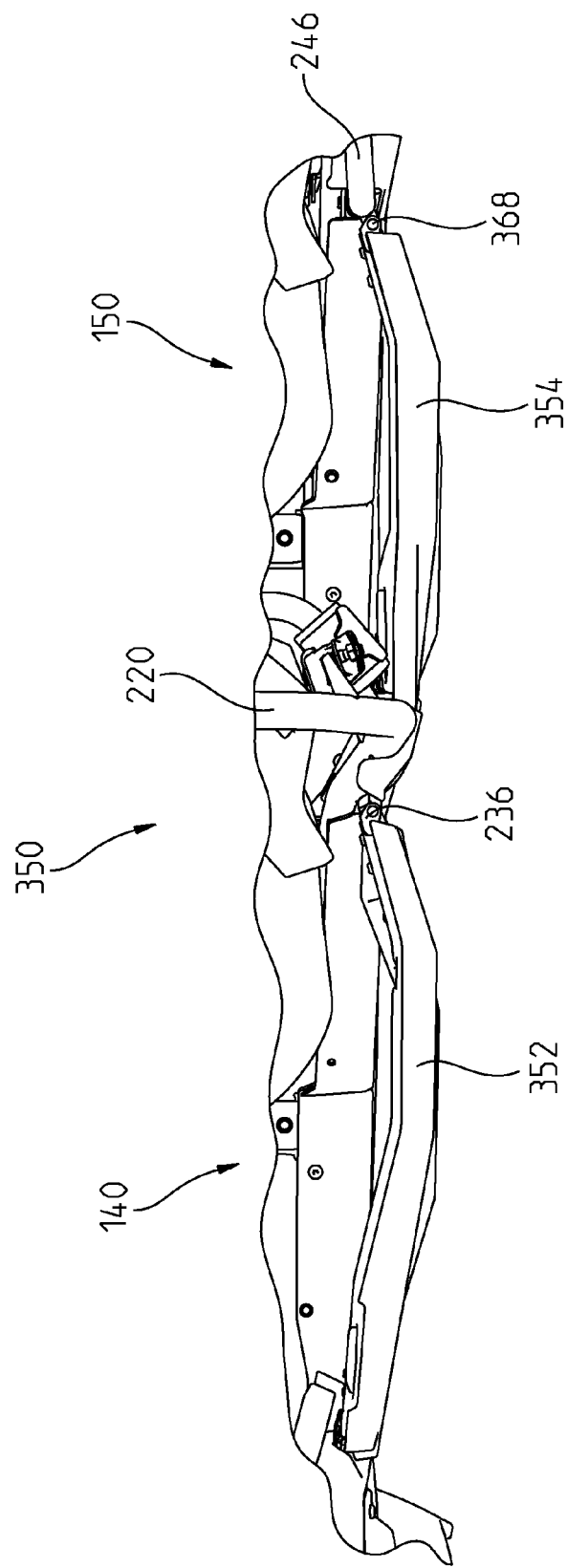

SIDE-BY-SIDE VEHICLE

CROSS-REFERENCE TO RELATED APPLICATIONS

The present application claims priority to U.S. Provisional Patent Application Ser. No. 61/829,434, filed on May 31, 2013, and entitled SIDE-BY-SIDE UTILITY VEHICLE, the complete disclosure of which is expressly incorporated by reference herein.

The present application also expressly incorporates by reference herein the complete disclosures of U.S. patent application Ser. No. 12/484,888, filed on Jun. 15, 2009, and entitled SIDE-BY-SIDE VEHICLE; U.S. Provisional Patent Application Ser. No. 61/712,396, filed on Oct. 11, 2012, and entitled SIDE-BY-SIDE VEHICLE; and U.S. Provisional Patent Application Ser. No. 61/829,743, filed on May 31, 2013, and entitled SIDE-BY-SIDE VEHICLE.

BACKGROUND OF THE PRESENT DISCLOSURE

The present disclosure generally relates to side-by-side vehicles, and more particularly, to side-by-side utility or all-terrain vehicles with seating for rear passengers.

Generally, all terrain vehicles ("ATVs") and utility vehicles ("UVs") are used to carry one or two passengers and a small amount of cargo over a variety of terrains. Such vehicles may include a bench seat configured to support a driver and up to two passengers. Other vehicles may be configured with an individual seat for the driver and an individual seat for a passenger. A cargo rack may be positioned rearward of the seats. A rear seating area may be included for supporting one or two additional passengers.

SUMMARY OF THE PRESENT DISCLOSURE

A utility vehicle includes a plurality of ground engaging members and a frame supported by the plurality of ground engaging members. The frame assembly extends generally along a longitudinal axis of the utility vehicle. The utility vehicle further includes a front seating section coupled to the frame. The front seating section is configured to support an operator and a first passenger. Additionally, the utility vehicle includes a rear seating section coupled to the frame. The rear seating section is configured to support a second passenger and a third passenger. The rear seating section has an angled panel configured as a dead pedal for the second and third passengers, and a portion of the rear seating section extends forwardly into the front seating section.

In a further illustrative embodiment of the present disclosure, a utility vehicle includes a plurality of ground engaging members and a frame supported by the plurality of ground engaging members. The utility vehicle further includes a roll cage assembly coupled to the frame and positioned generally above the frame. Additionally, the utility vehicle includes an operator area defined between the frame assembly and the roll cage assembly. The utility vehicle also includes a door assembly having a front door and a rear door. The front and rear doors are configured to rotate between a closed position and an open position. The front and rear doors are coupled to at least one of the roll cage assembly and the frame assembly when in the closed position, and the position of the front and rear doors is adjustable relative to the roll cage assembly when in the closed position.

The above mentioned and other features of the invention, and the manner of attaining them, will become more apparent and the invention itself will be better understood by reference to the following description of embodiments of the invention taken in conjunction with the accompanying drawings.

BRIEF DESCRIPTION OF THE DRAWINGS

FIG. 28 is a detailed view of a seat belt retractor of the vehicle of FIG. 1 coupled to the roll cage assembly of FIG. 17;
FIG. 29 is an exploded view of the seat belt retractor and roll cage assembly of FIG. 29.

FIG. 39 is a left front perspective view of a panel of the door assembly of FIG. 33;

FIG. 40 is a top view of the door assembly of FIG. 33;

DETAILED DESCRIPTION OF THE DRAWINGS

Figure 1:
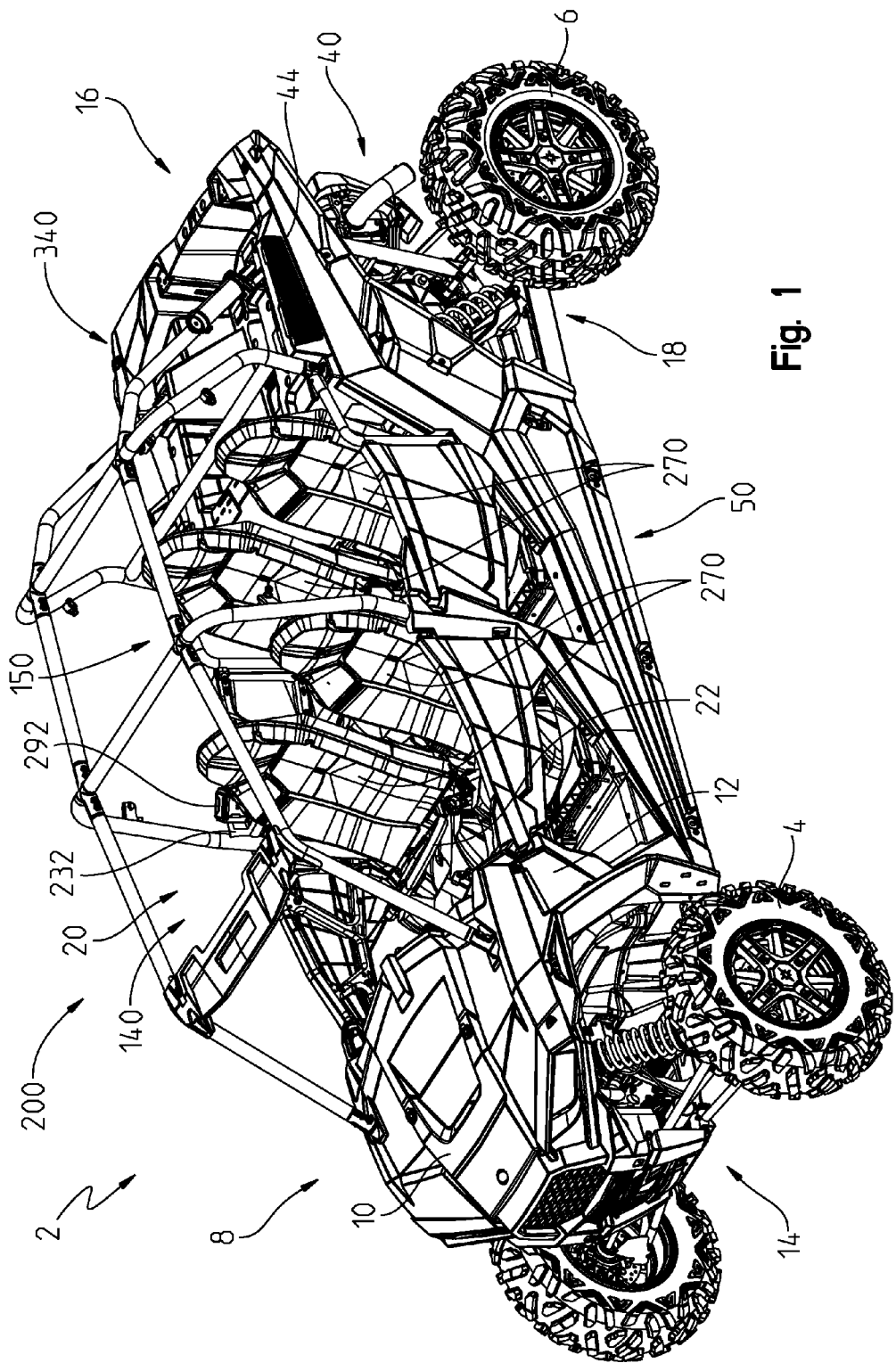
FIG. 1 is a left front perspective view of an exemplary vehicle of the present disclosure.

Corresponding reference characters indicate corresponding parts throughout the several views. Unless stated otherwise the drawings are proportional.

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as all-terrain vehicles, motorcycles, watercraft, snowmobiles, people movers, and golf carts.

Figure 38:
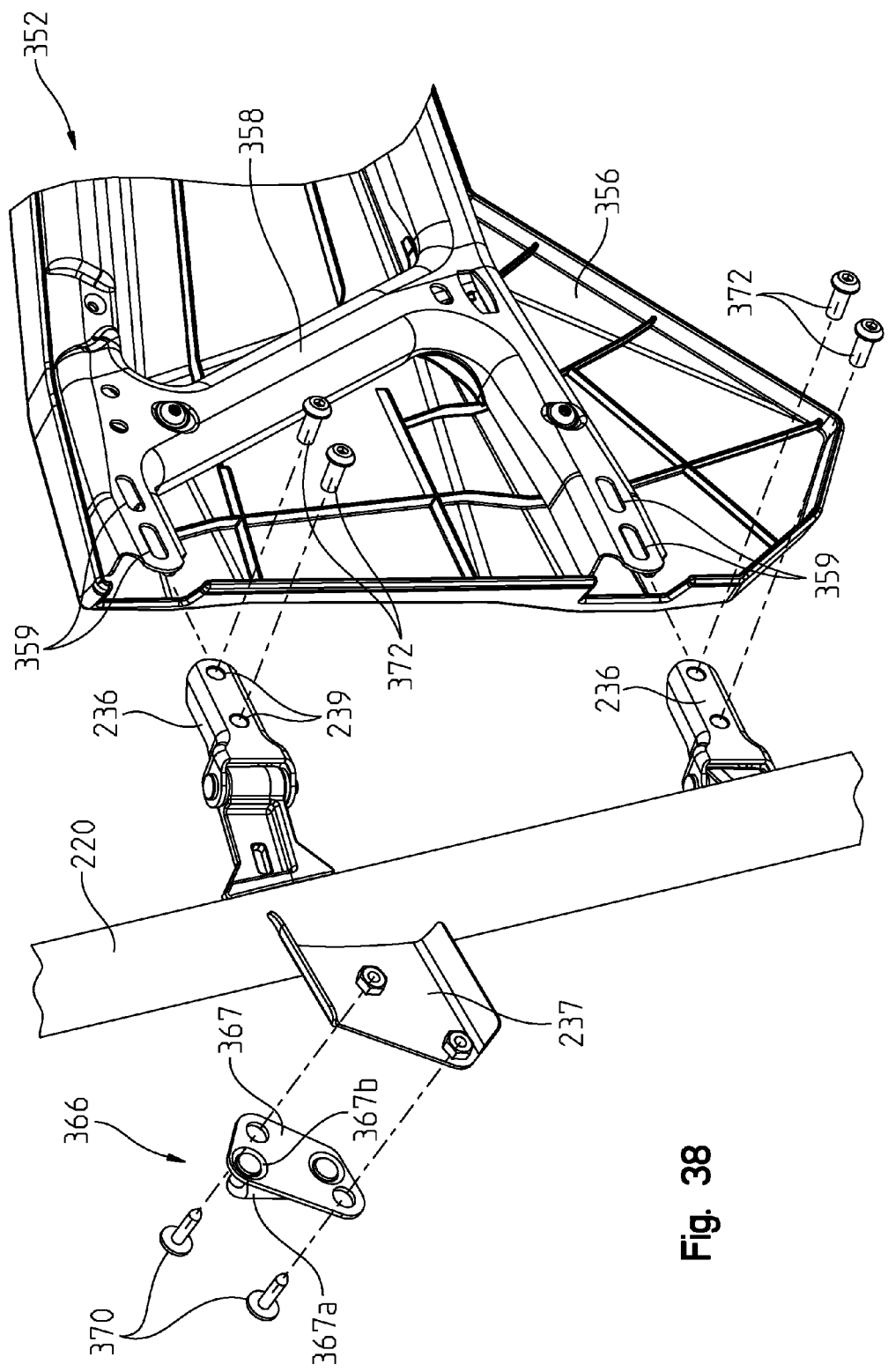
FIG. 38 is an exploded view of the coupling between the door assembly of FIG. 33 and the roll cage assembly of FIG. 17.
Figure 42:
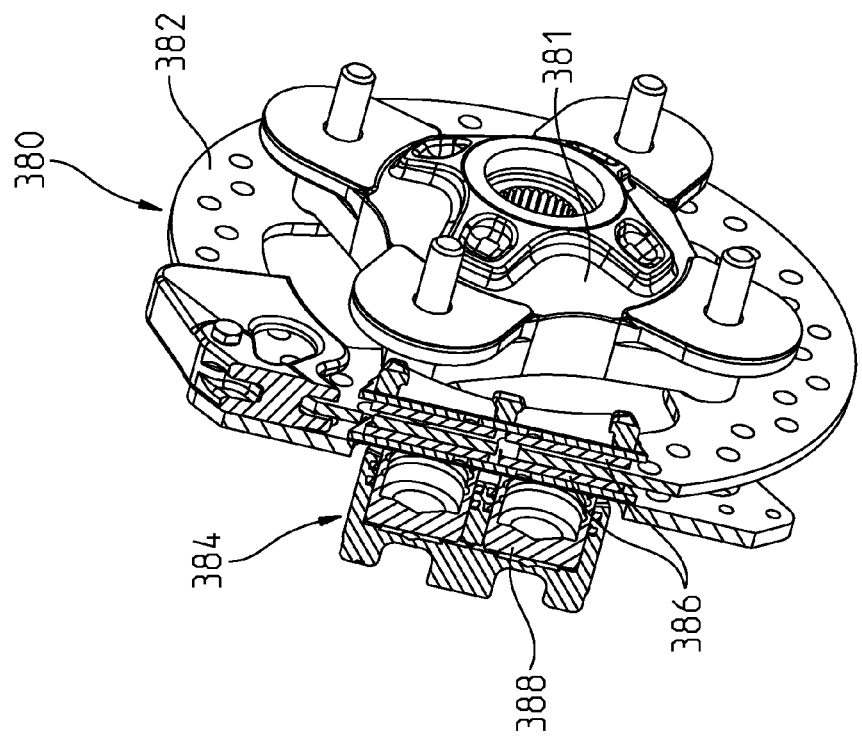
FIG. 42 is a cross-sectional view of the brake assembly of FIG. 38.
Figure 41:
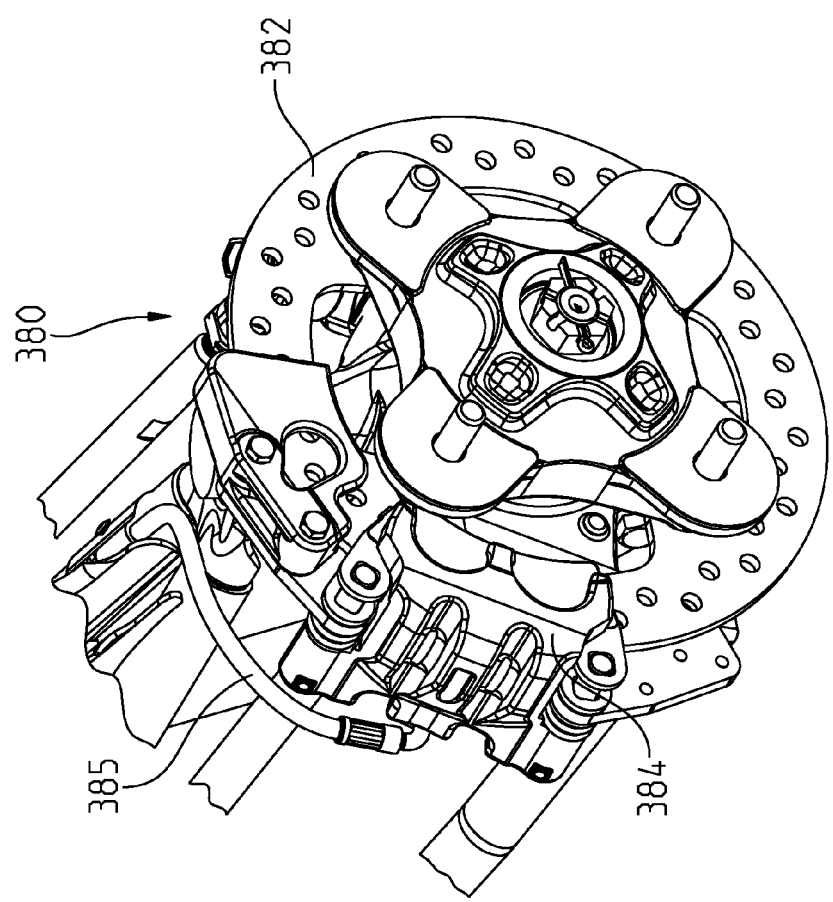
FIG. 41 is a left front perspective view of a brake assembly of the vehicle of FIG. 1.

With reference to FIGS. 1-8, a utility vehicle 2 is supported on a ground surface with front ground-engaging members, illustratively front wheels 4, and rear ground-engaging members, illustratively rear wheels 6. Front and rear wheels 4, 6 are operably coupled to a brake assembly 380, as shown in FIGS. 38 and 39 and detailed further herein. Additionally, front and rear wheels 4, 6 are operably coupled to a powertrain assembly 40. Powertrain assembly 40 may include an engine, a transmission, for example a continuously variable transmission ("CVT"), a driveshaft, a front differential, and a rear differential. Powertrain assembly 40 draws air from intake assembly 44, which is detailed further in co-pending U.S. Provisional Patent Application Ser. No. 61/829,743, filed on May 31, 2013, and entitled SIDE-BY-SIDE VEHICLE, the complete disclosure of which is expressly incorporated by reference herein. Powertrain assembly 40 also is operably coupled to an exhaust assembly 42.

As shown in FIGS. 1-8, front wheels 4 support a front end 8 of utility vehicle 2, which includes at least a hood 10, a plurality of outer body panels 12, and a front suspension assembly 14. Rear wheels 6 support a rear end 16 of utility vehicle 2, which includes at least a cargo box 340, powertrain assembly 40, intake assembly 44, exhaust assembly 42, and a rear suspension assembly 18. In one embodiment, front suspension assembly 14 and rear suspension assembly 18 include bypass shock absorbers, as detailed further in co-pending U.S. Provisional Patent Application Ser. No. 61/829, 743, filed on May 31, 2013, and entitled SIDE-BY-SIDE VEHICLE, the complete disclosure of which is expressly incorporated by reference herein.

Figure 5:
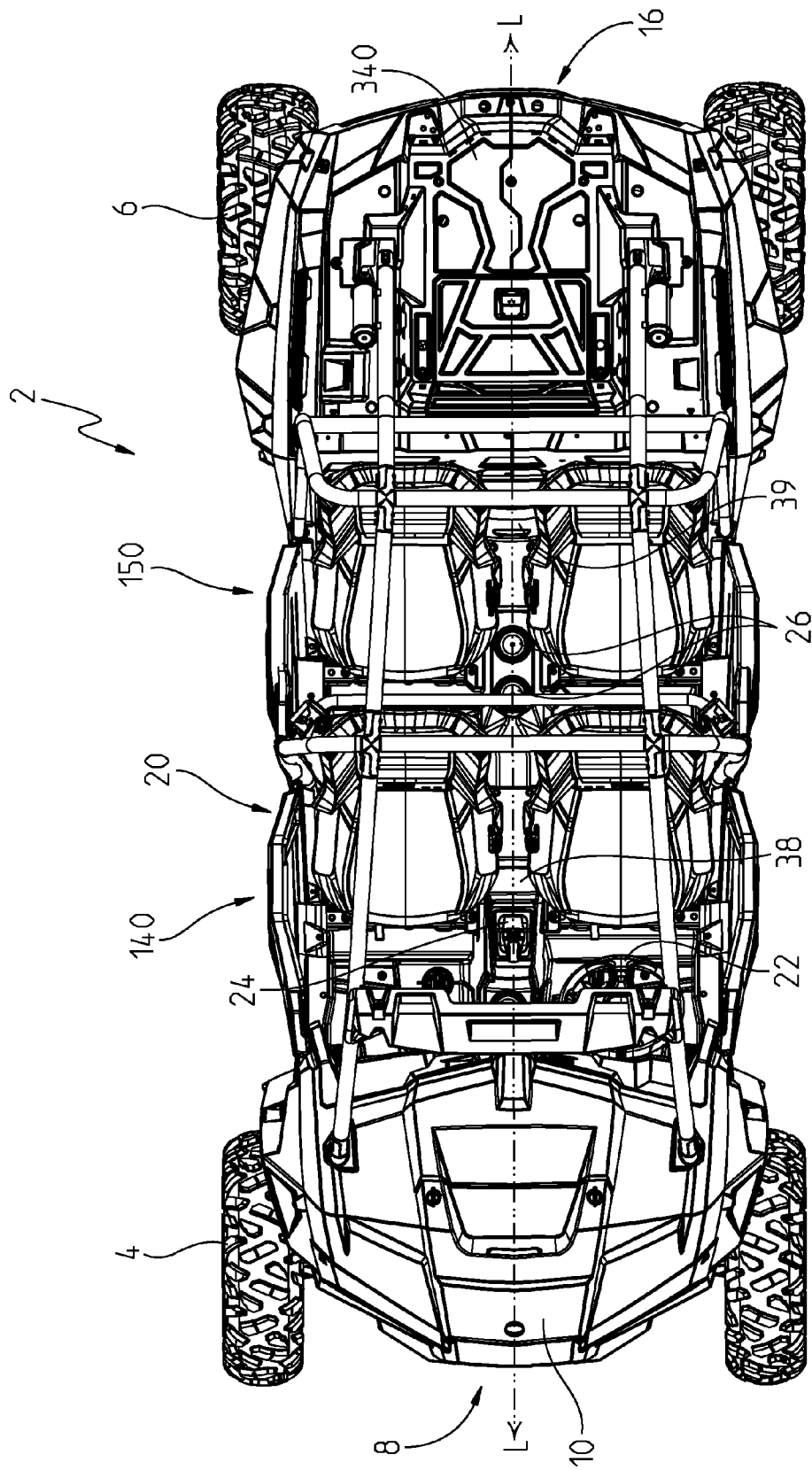
FIG. 5 is a top view of the vehicle of FIG. 1.
Figure 6:
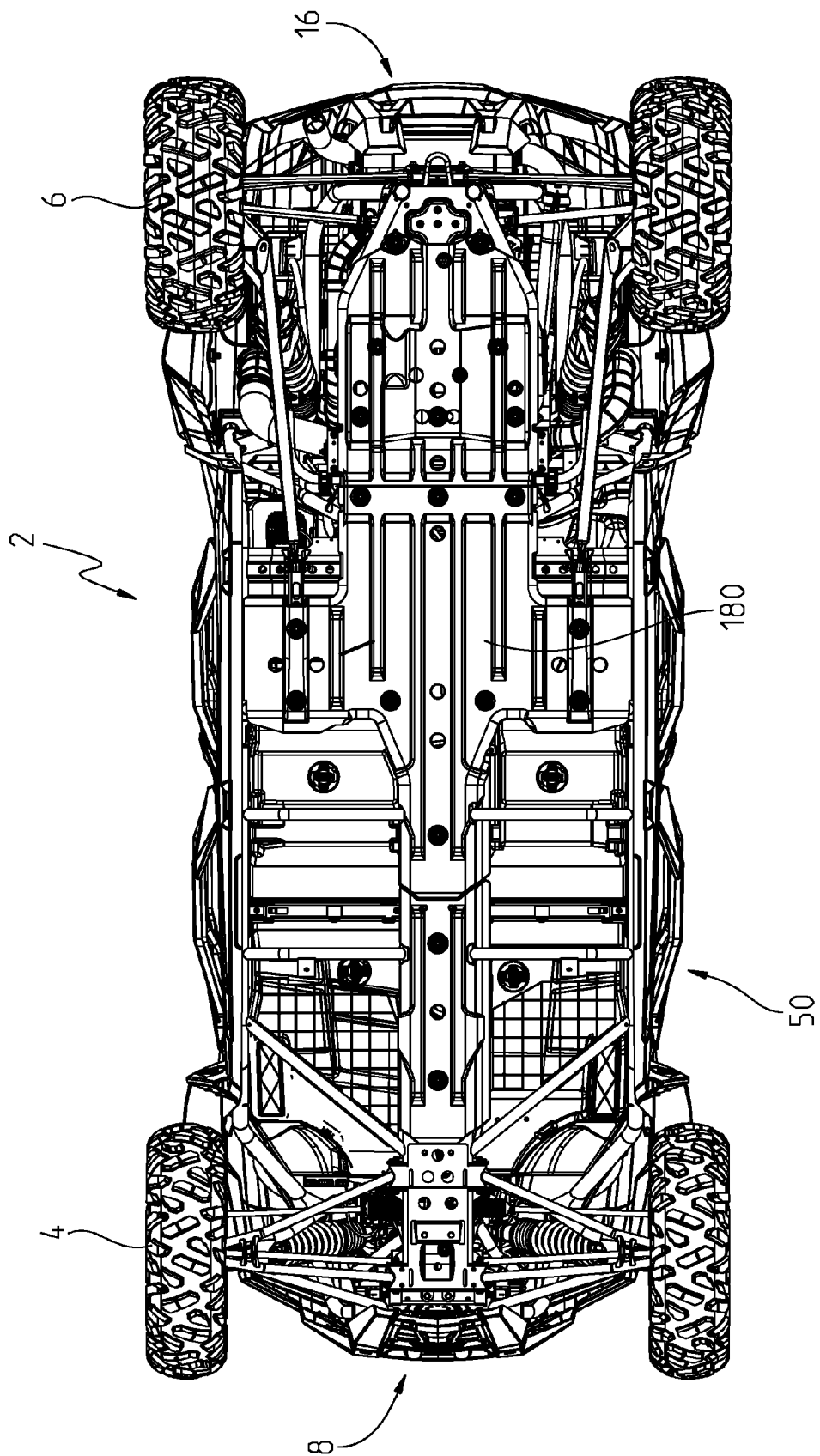
FIG. 6 is a bottom view of the vehicle of FIG. 1.
Figure 8:
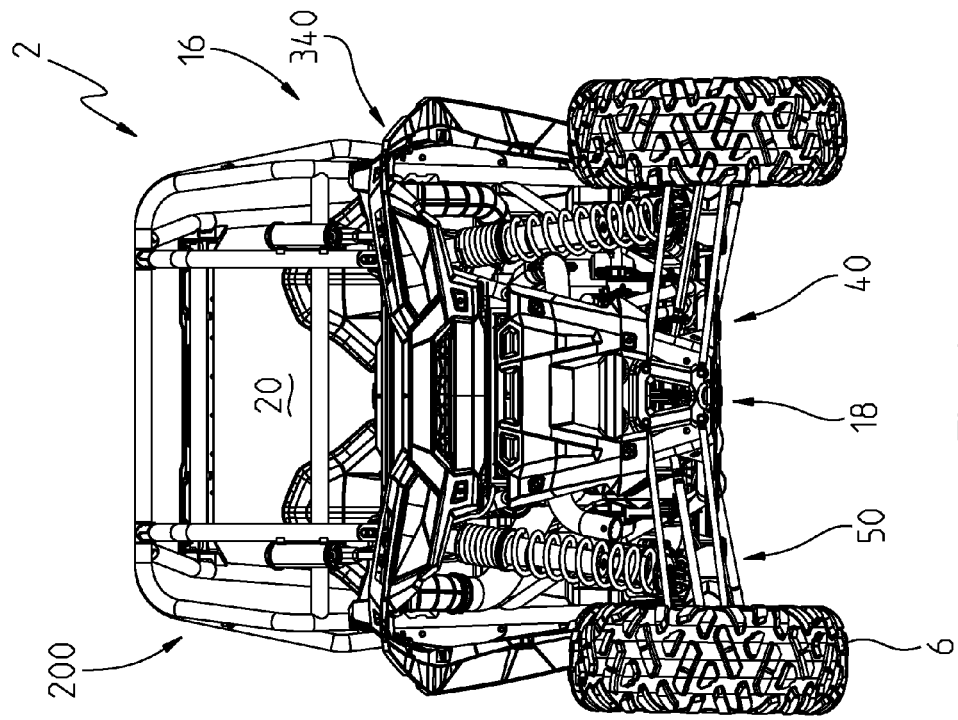
FIG. 8 is a rear view of the vehicle of FIG. 1.
Figure 7:
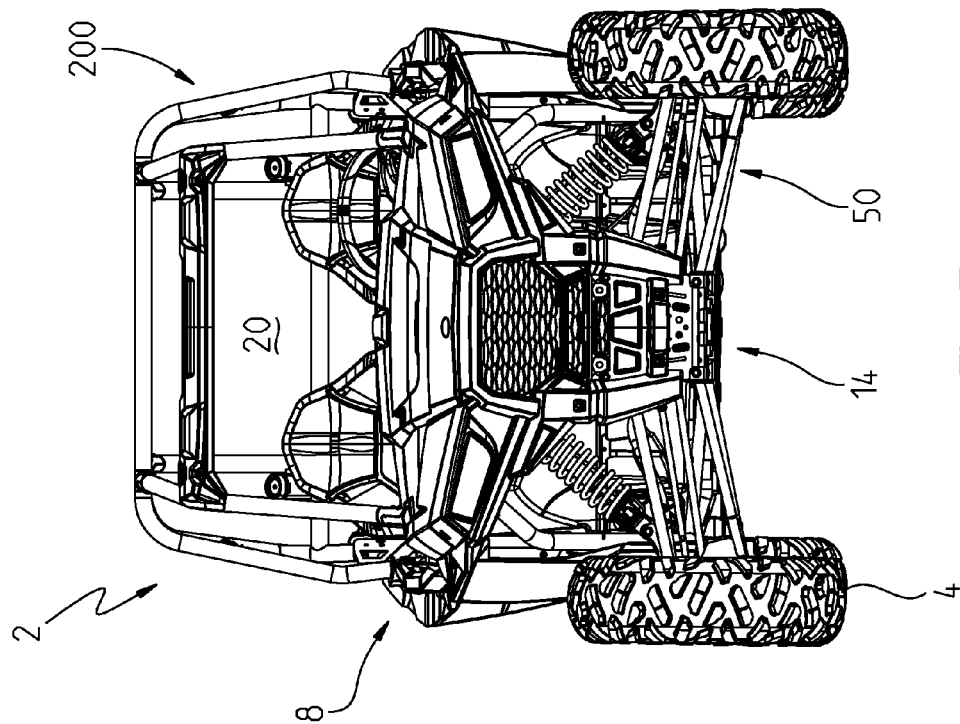
FIG. 7 is a front view of the vehicle of FIG. 1.

Front and rear wheels 4, 6 of utility vehicle 2 further support a frame assembly 50 and a roll cage assembly 200 extending generally along a longitudinal axis L of utility vehicle 2, as shown in FIG. 5. Illustratively, frame assembly 50 is coupled to roll cage assembly 200 to define an operator area 20. Operator area 20 is supported on frame assembly 50 between front end 8 and rear end 16 and includes seating for an operator and up to three passengers. More particularly, operator area 20 includes a front seating section 140 for an operator and a front passenger, and a rear seating section 150 for up to two rear passengers. A plurality of seats 270 are supported within the operator area 20 for the operator and passengers, as detailed further herein. In one embodiment, seats 270 are arranged in a side-by-side configuration, as shown in FIG. 1. Alternatively, seats 270 may be integrally coupled together to define a bench seat in front seating section 140 and/or a bench seat in rear seating section 150.

As shown in FIGS. 1-5, operator area 20 also includes a plurality of controls and accessories. For example, operator area 20 includes steering controls, which may include a steering wheel 22 and an electric power steering unit. Additional controls include throttle controls, such as an accelerator pedal, a brake pedal, and a shift lever 24.

Figure 2:
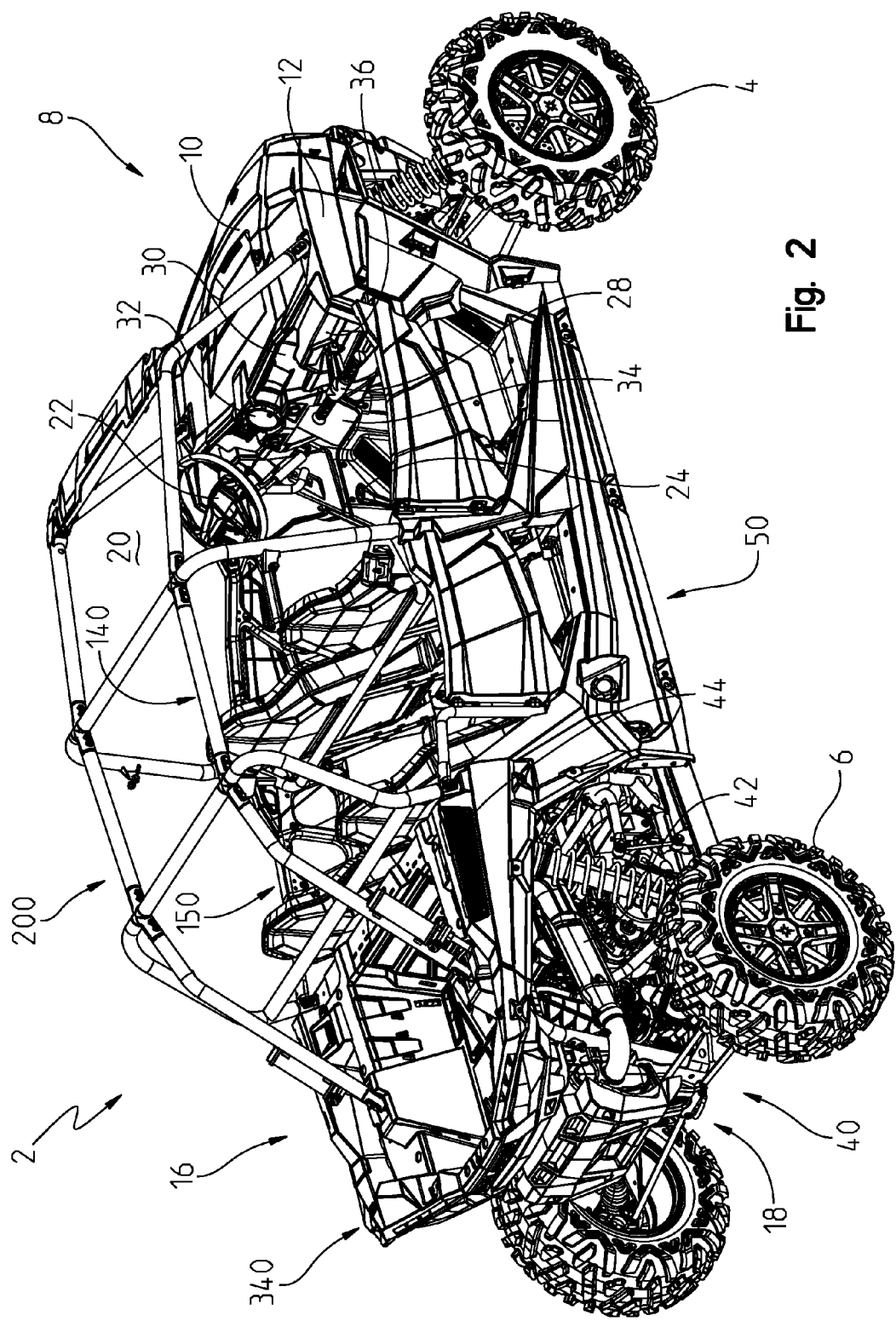
FIG. 2 is a right rear perspective view of the vehicle of FIG. 1.
Figure 3:
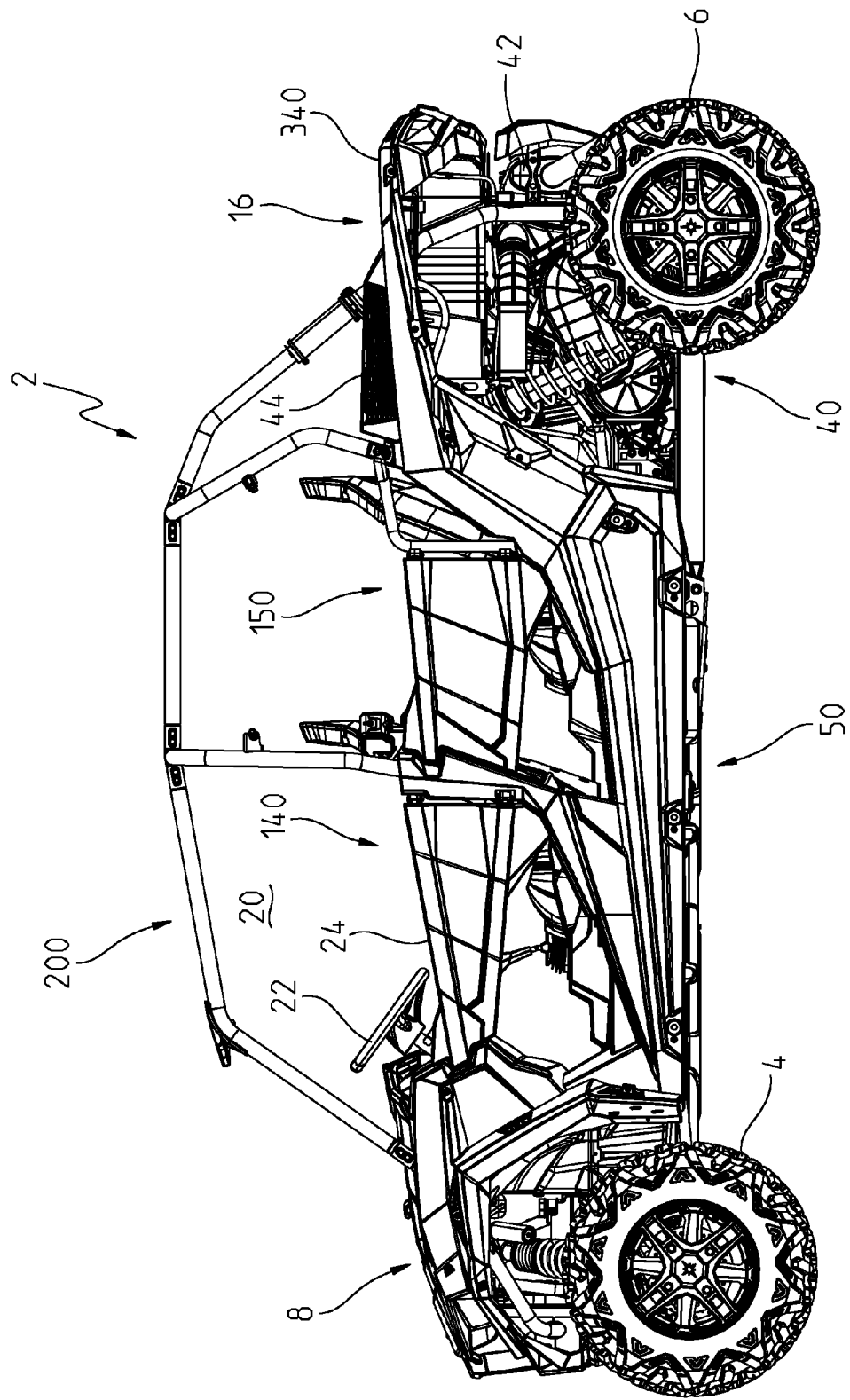
FIG. 3 is a left side view of the vehicle of FIG. 1.
Figure 4:
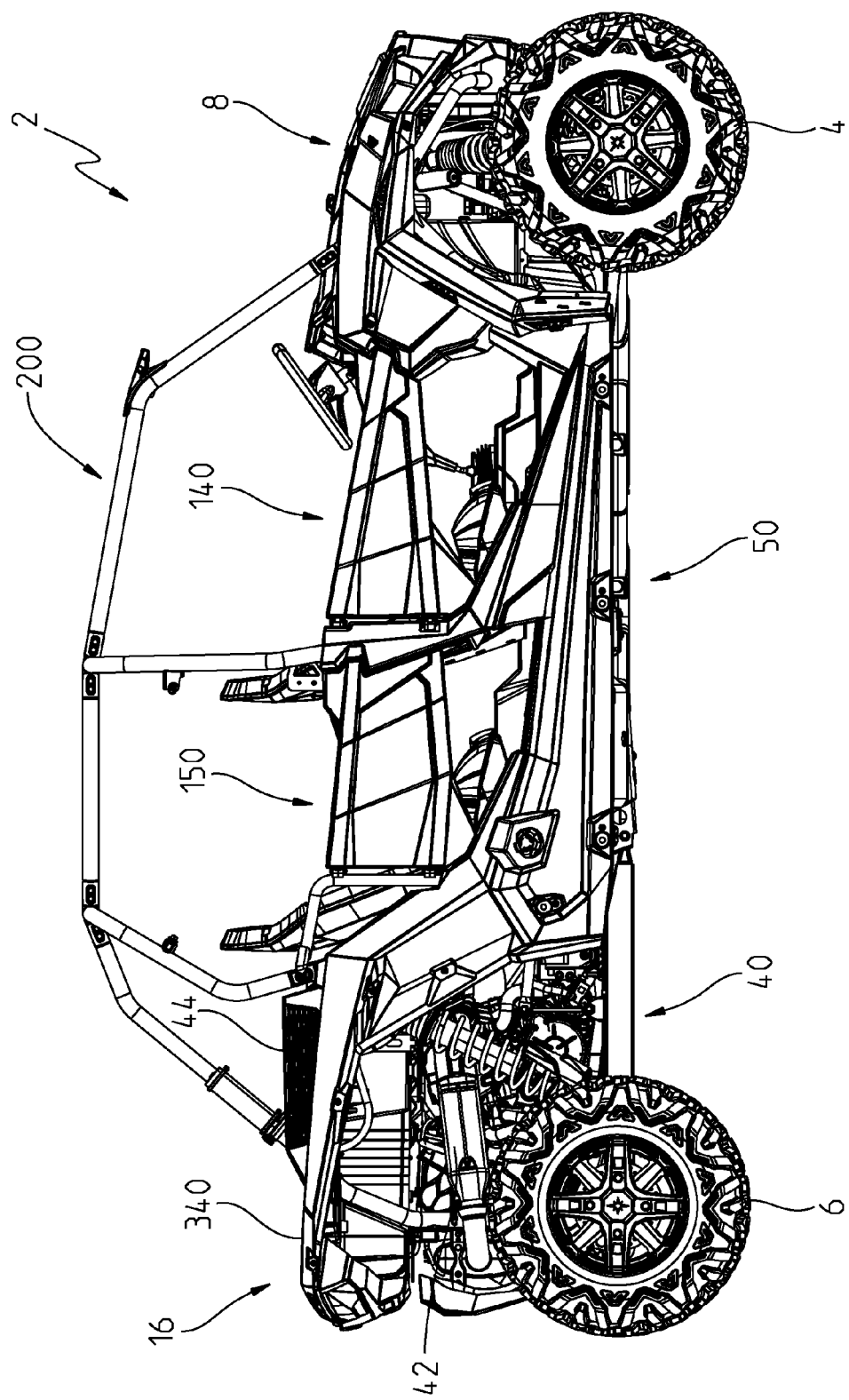
FIG. 4 is a right side view of the vehicle of FIG. 1.

Accessories which may be supported within operator area 20 include a plurality of cup holders 26, as shown in FIG. 5, and a passenger grab bar 28, as shown in FIG. 2. Operator area 20 may further include a dashboard assembly 30 for supporting additional controls, such as gauges 32 and a display screen 34. Dashboard assembly 30 may also support a glove box 36 near passenger grab bar 28. Additional storage compartments may be included in operator area 20, for example in a front center console 38. As shown best in FIG. 5, front center console 38 may also support shift lever 24 and is illustratively positioned intermediate seats 270 of front seating section 140. A rear center console 39 may be supported intermediate seats 270 of rear seating section 150 and illustratively supports cup holders 26. Additionally, rear center console 39 may include additional storage compartments. In one embodiment, rear center console 39 is integrally formed with front center console to define a unitary center console extending longitudinally through operator area 20.

Referring to FIGS. 9-16, frame assembly 50 includes a front frame portion 52, an intermediate frame portion 54, and a rear frame portion 56. Frame assembly 50 includes front longitudinally-extending frame members 58 extending between front frame portion 52 and intermediate frame portion 54, and rear longitudinally-extending frame members 60 extending between intermediate frame portion 54 and rear frame portion 56. As shown best in FIG. 12A, front longitudinally-extending frame members 58 are coupled to rear longitudinally-extending frame members 60 with a plurality of couplers 62. Couplers 62 may be cast members coupled to frame members 58, 60 with welds, adhesive, rivets, bolts, and other similar fasteners. Illustratively, a portion of couplers 62 may be received within frame members 58, 60 for coupling thereto. Alternatively, couplers 62 may be integrally formed with frame members 58, 60.

Figure 12A:
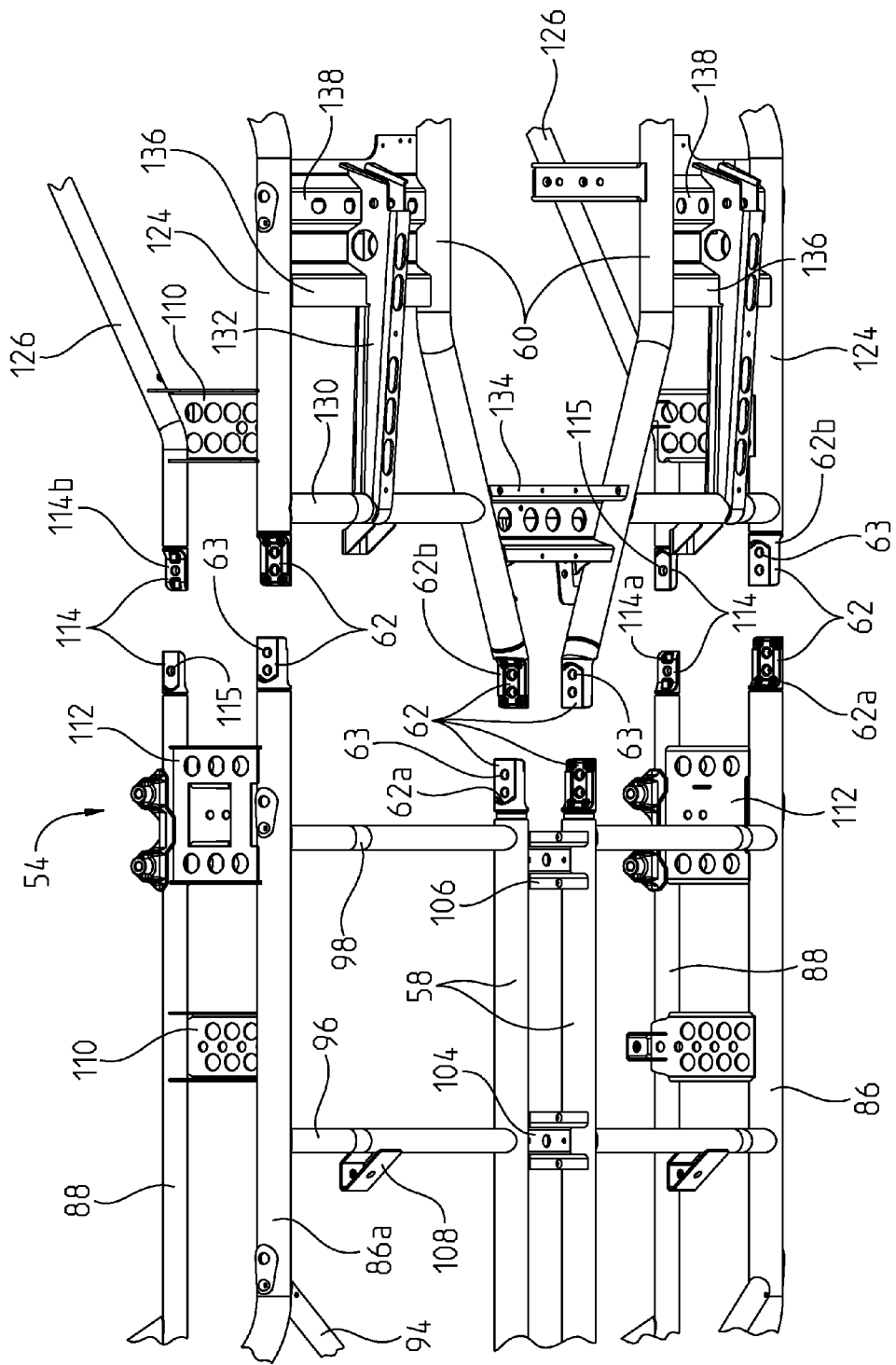
FIG. 12A is an exploded view of an intermediate frame portion of the frame assembly of FIG. 9.

As shown in FIG. 12A, couplers 62 include a front portion 62a coupled to front longitudinally-extending frame members 58 and a rear portion 62b coupled to rear longitudinally-extending frame members 60. Front portion 62a includes an inner surface that is generally complimentary to an outer surface of rear portion 62b. As such, when front and rear portions 62a, 62b are coupled together, the diameter of coupler 62 is approximately equal to the diameter of frame members 58, 60. Both front and rear portions 62a, 62b include a plurality of apertures 63 for receiving a bolt, screw, rivet, or other fastener therethrough in order to couple front and rear portions 62a, 62b together.

Figure 12B:
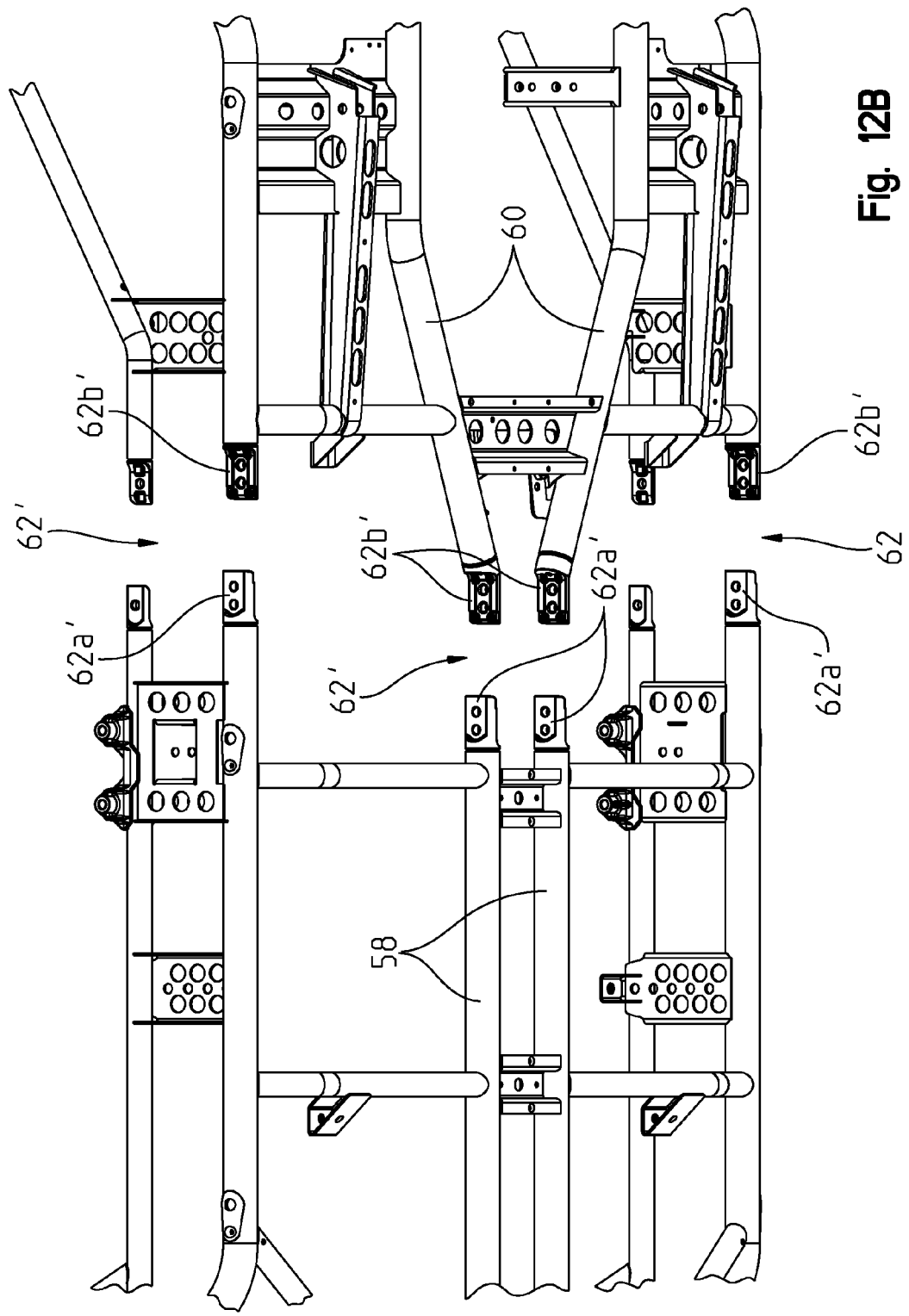
FIG. 12B is an exploded view of an alternative embodiment of the intermediate frame portion of FIG. 12A.

Alternatively, as shown in FIG. 12B, an alternative embodiment of couplers 62 is shown as couplers 62'. Couplers 62' include a front portion 62a' coupled to front longitudinally-extending frame members 58 and a rear portion 62b' coupled to rear longitudinally-extending frame members 60. One of front portions 62a' includes an inner surface that is generally complimentary to an outer surface of the corresponding rear portion 62b'. Similarly, the other of front portions 62a' includes an outer surface that is generally complimentary to an inner surface of the corresponding rear portion 62b'. As such, when front and rear portions 62a', 62b' are coupled together, the diameter of coupler 62' is approximately equal to the diameter of frame members 58, 60.

Figure 9:
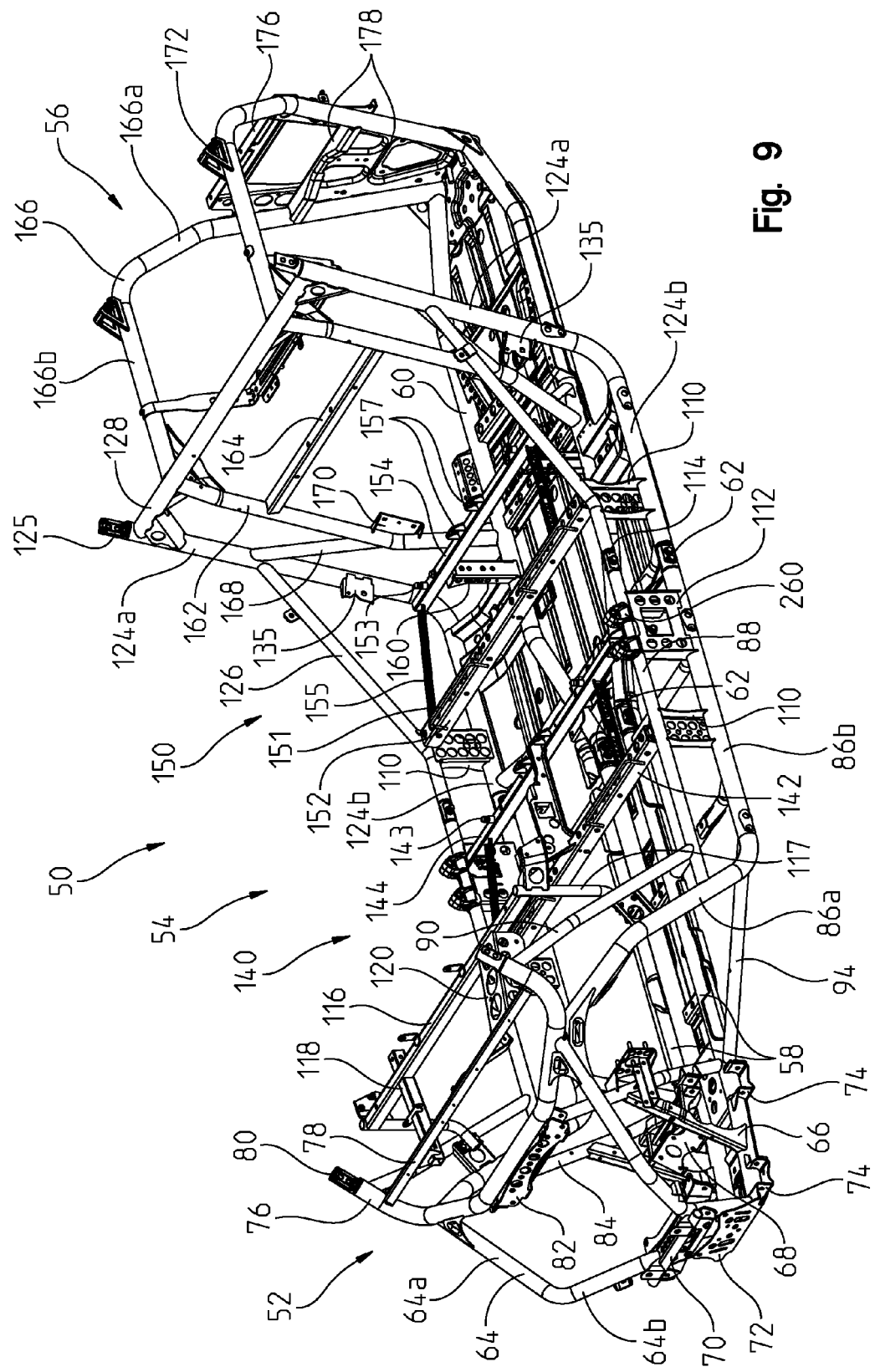
FIG. 9 is a left front perspective view of a frame assembly of the vehicle of FIG. 1.
Figure 10:
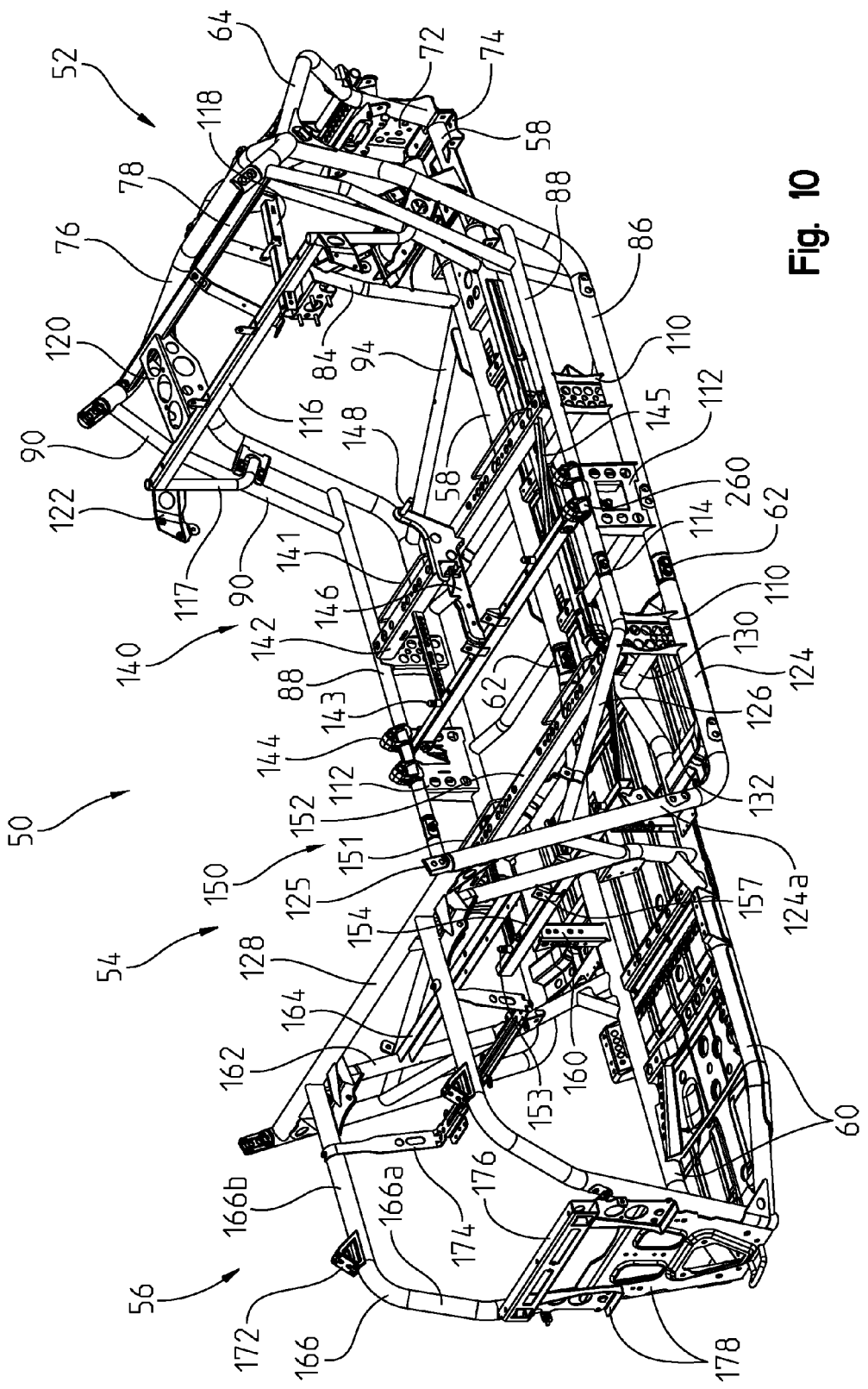
FIG. 10 is a right rear perspective view of the frame assembly of FIG. 9.
Figure 11:
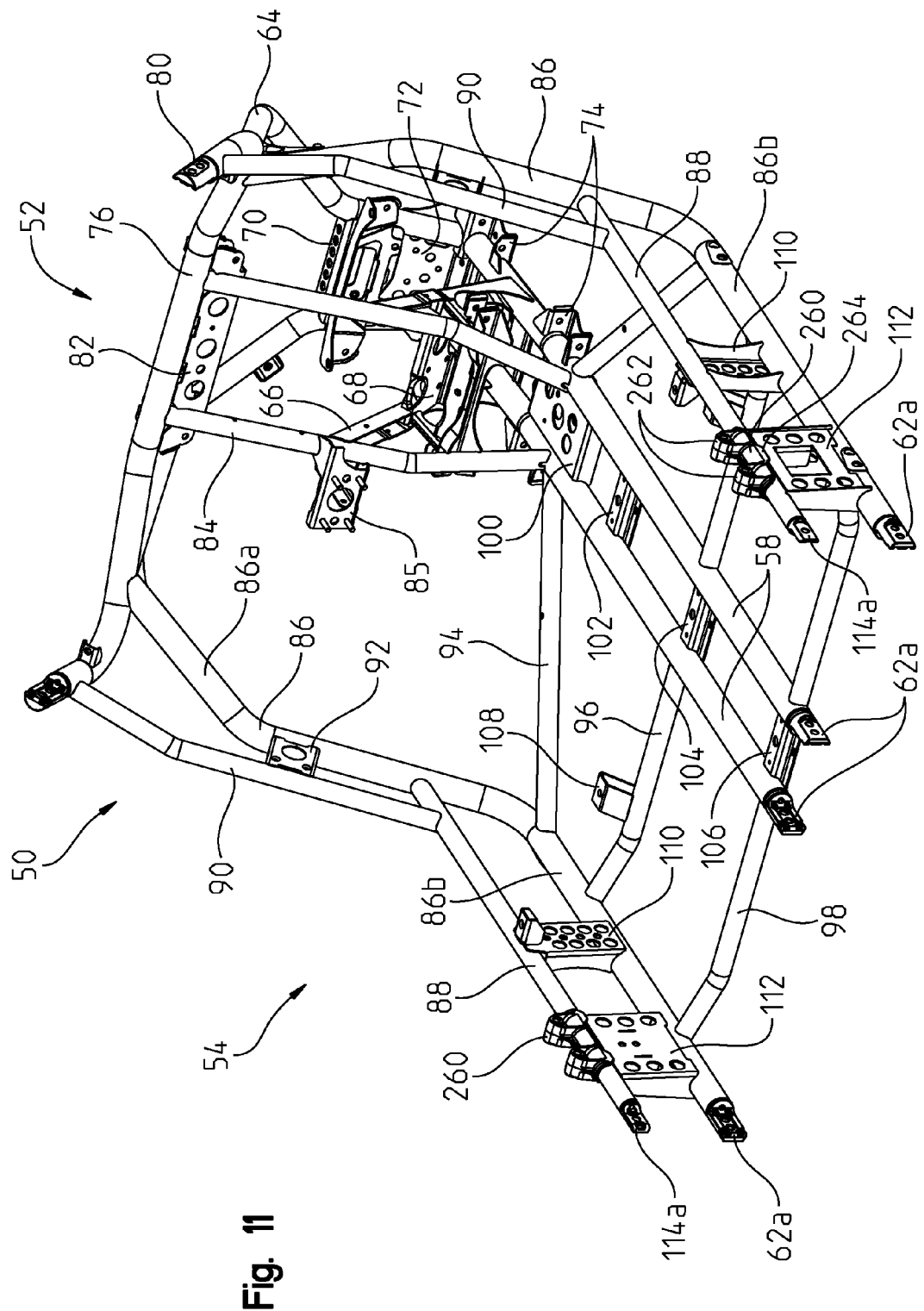
FIG. 11 is a right rear perspective view of the frame assembly of FIG. 9.

Referring to FIGS. 9-11, front frame portion 52 includes frame members 64 and braces 66. Braces 66 are coupled to front longitudinally-extending frame members 58 and extend in a generally upward direction. A bracket 68 is supported between braces 66 and may be used to support a portion of front suspension assembly 14, the steering controls, the front differential, or any other component supported by front frame portion 52. Additionally, brackets 74 may be configured to support a portion of front suspension assembly 14.

Frame members 64 include an upper portion 64a and a lower portion 64b. Illustratively, upper portion 64a bends in a generally downward direction to define lower portion 64b. Upper portion 64a is coupled to intermediate frame portion 54, and lower portion 64b is coupled to front longitudinally-extending frame members 58. A bracket 70 and a plate member 72 also are coupled to lower portion 64b of frame members 64. Bracket 70 and plate member 72 may be configured to support a plurality of accessories, for example tie-downs, a winch assembly, a trailer hitch, or other accessories of utility vehicle 2. Additionally, bracket 70 and/or plate member 72 may be configured to support a portion of a radiator assembly, body panels 12, or other components of utility vehicle 2.

Referring to FIGS. 9-12A, intermediate frame portion 54 includes an upper frame member 76, inner upstanding members 84, outer upstanding members 90, forward longitudinal frame tubes 86, forward frame rails 88, rearward longitudinal frame tubes 124, and rearward frame rails 126. Upper frame member 76 is coupled to frame members 64 of front frame portion 52. Upper frame member 76 is generally U-shaped and includes couplers 80 for coupling frame assembly 50 to roll cage assembly 200. Couplers 80 may be cast components coupled to upper frame member 76 with welds, bolts, adhesive, rivets, or other fasteners; or, alternatively, may be integrally formed with upper frame member 76. Upper frame member 76 also may include a bracket 82 for mounting a portion of the steering controls, hood 10, body panels 12, or other components of utility vehicle 2.

A brace member 78 of intermediate frame portion 54 may be coupled to upper frame member 76 and may define a support surface for dashboard assembly 30 and/or an accessory of utility vehicle 2, for example a windshield. Another brace member 116 is positioned rearward of brace member 78 and is generally parallel thereto. Legs 117 of brace member 116 may be coupled to forward longitudinal frame tubes 86. Brace member 116 also includes a bracket 122 configured to support a door latch, as detailed further herein and shown best in FIG. 34. Both brace member 78 and brace member 116 support a steering mount 120 for supporting a portion of the steering controls, such as steering wheel 22. Additionally, brace members 78 and 116 support a mount 118 for passenger grab bar 28.

Upper frame member 76 also is coupled to inner upstanding members 84, outer upstanding members 90, and forward longitudinal frame tubes 86. Inner upstanding members 84 extend between upper frame member 76 and front longitudinally-extending frame members 58. A bracket 85 may be supported on at least one upstanding member 84 for supporting various components of utility vehicle 2.

Upper frame member 76 also is coupled to forward longitudinal frame tubes 86, which include an upper portion 86a and a lower portion 86b. Upper portion 86a is angled outwardly from upper frame member 76 and also is angled rearwardly toward lower portion 86b. Lower portion 86b generally defines the lateral outer boundary of frame assembly 50 such that the space between lower portions 86b generally defines the width of frame assembly 50. Forward longitudinal frame tubes 86 also are coupled to a plurality of brackets, illustratively brackets 92, brackets 110, and brackets 112, as detailed further herein. Brackets 92, 110, and 112 are configured to support various components of utility vehicle 2. Brackets 110 and 112 may be stamped components of frame assembly 50 and, illustratively, frame assembly 50 includes four brackets 110 and two brackets 112.

Lower portions 86b of forward longitudinal frame tubes 86 are connected to couplers 62, and more particularly, to front portions 62a of couplers 62. As shown in FIG. 12A, couplers 62 also are connected to rearward longitudinal frame tubes 124, which include an upper portion 124a and a lower portion 124b. Illustratively, rear portion 62b of couplers 62 is received within lower portion 124b of rearward longitudinal frame tubes 124 and may be coupled thereto with adhesive, rivets, welds, bolts, or other fasteners. Alternatively, rear portions 62b of couplers 62 may be integrally formed with rearward longitudinal frame tubes 124. In one embodiment, forward longitudinal frame tubes 86 and rearward longitudinal frame tubes 124 include couplers 62', as shown in FIG. 12B.

Upper portion 124a of rearward longitudinal frame tubes 124 includes a coupler 125 for coupling roll cage assembly 200 to frame assembly 50. Couplers 125 may be cast couplers similar to couplers 80. Upper portion 124a of rearward longitudinal frame tubes 124 also includes a bracket 135 for mounting various component of utility vehicle 2 to frame assembly 50. For example, bracket 135 may be configured to support a hip retractor or other portion of a seat belt assembly 290 of utility vehicle 2.

As shown in FIG. 11, upper frame member 76 also is coupled to outer upstanding members 90. Outer upstanding members 90 extend between upper frame member 76 and forward frame rails 88. Forward frame rails 88 are positioned above forward longitudinal frame tubes 86. More particularly, forward frame rails 88 are generally parallel to lower portions 86b of forward longitudinal frame tubes 86 and are spaced apart therefrom by brackets 110 and 112. As such, brackets 110 and 112 are coupled to both forward longitudinal frame tubes 86 and forward frame rails 88.

Figure 13:
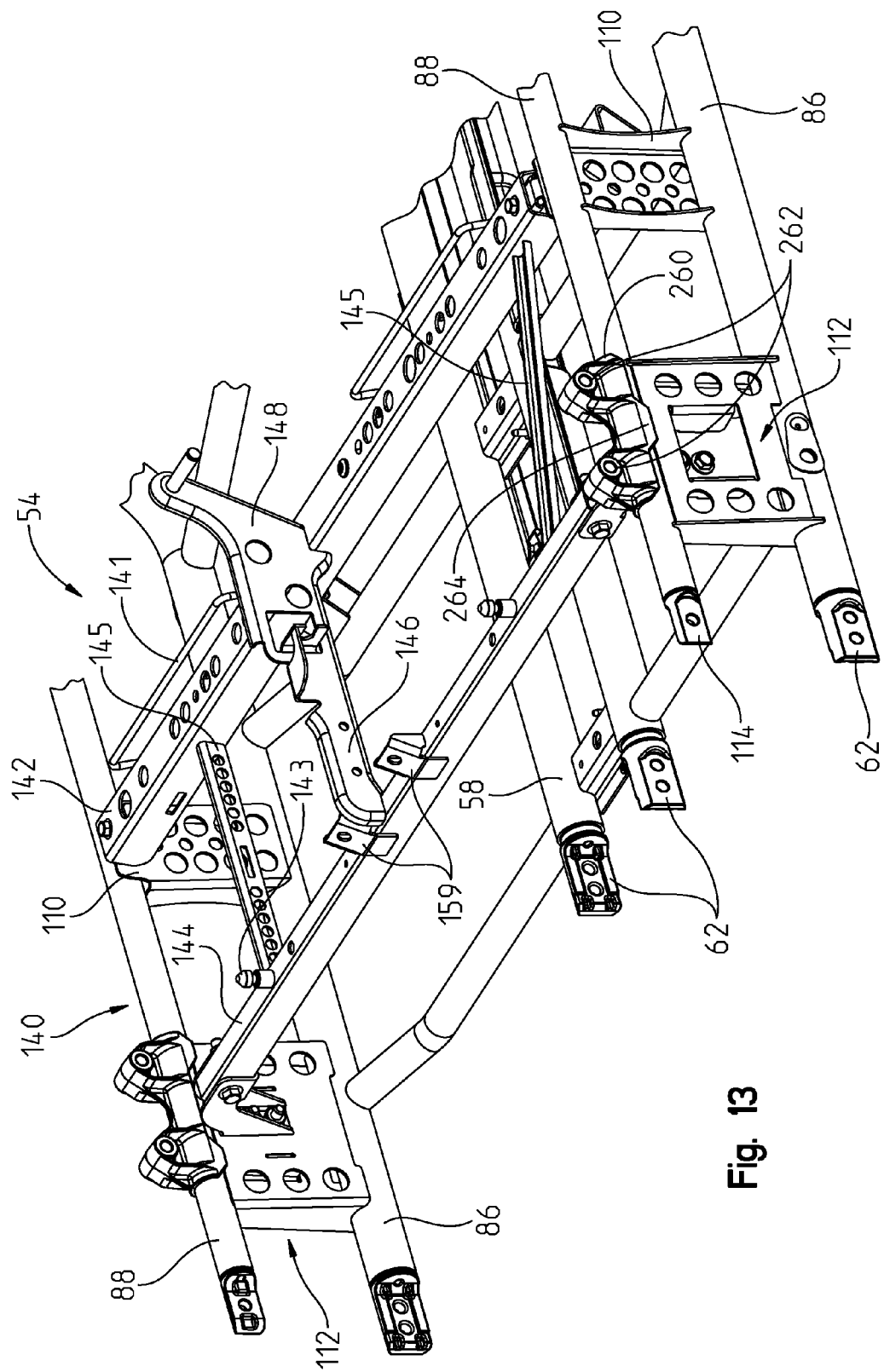
FIG. 13 is a right rear perspective view of the intermediate frame portion of FIG. 12.
Figure 14:
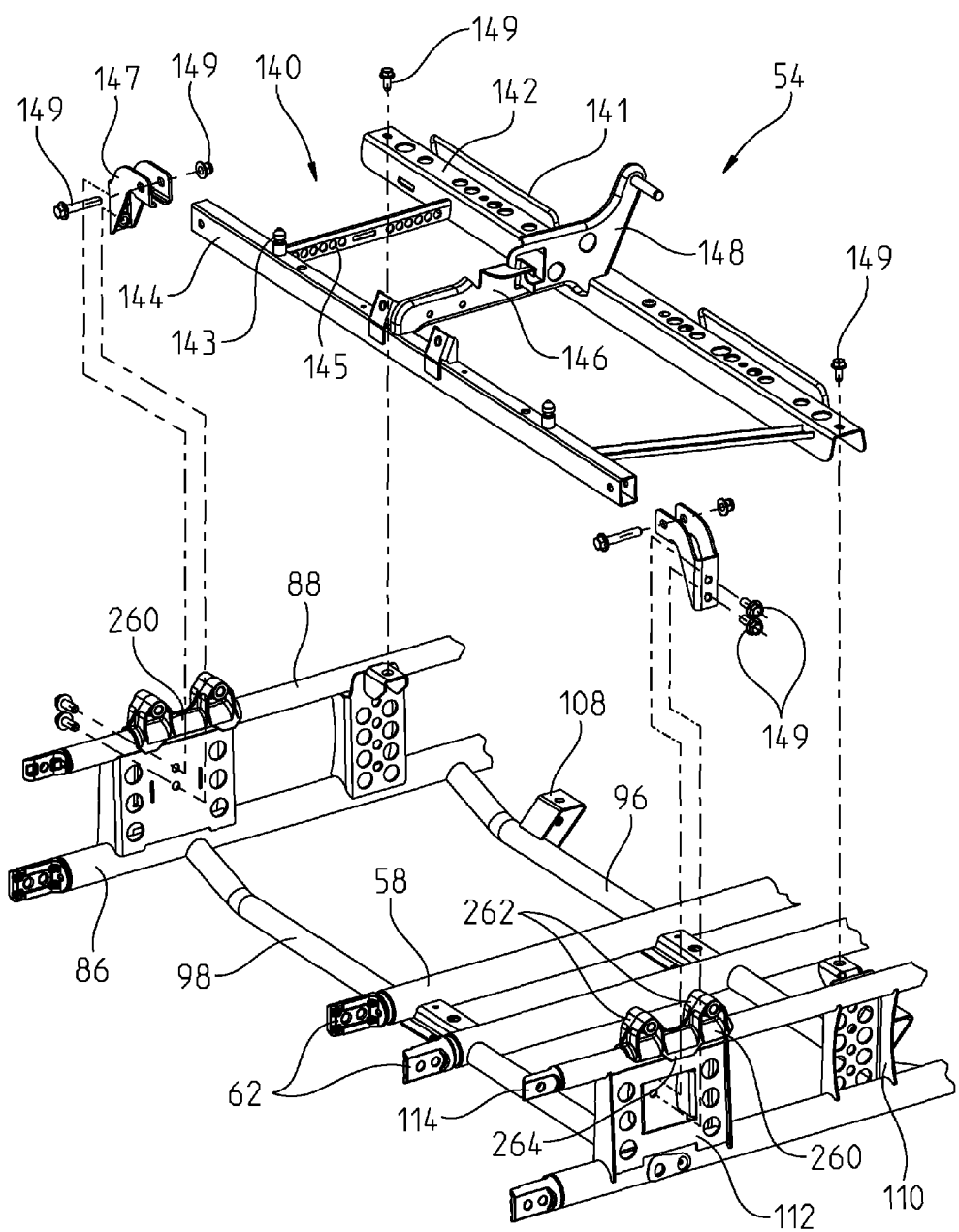
FIG. 14 is an exploded view of the intermediate frame portion of FIG. 13.
Figure 25:
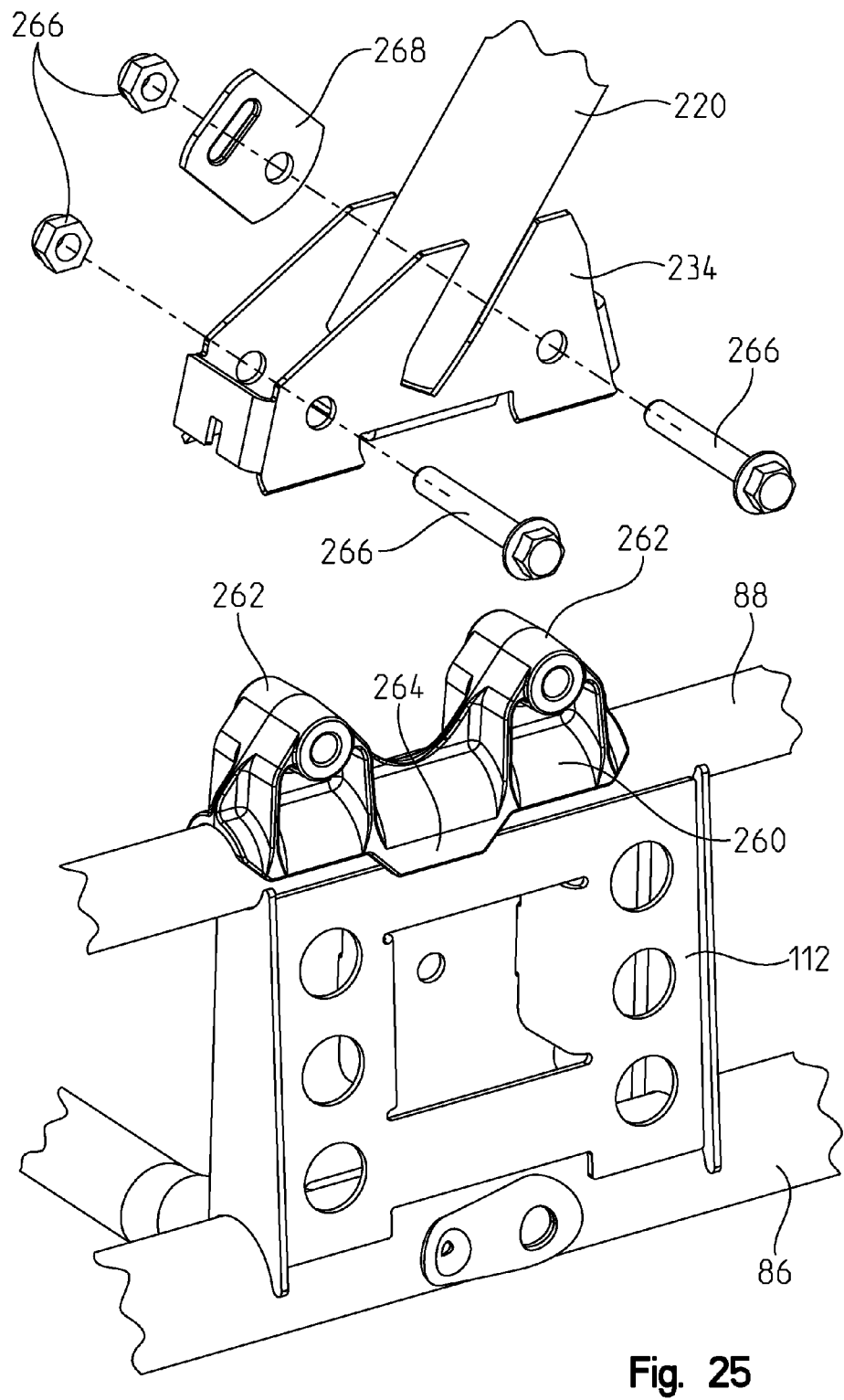
FIG. 25 is an exploded view of the connection of FIG. 23.

Referring to FIGS. 13, 14, and 25, intermediate frame portion 54 also includes mounting members 260 positioned above brackets 112. Mounting members 260 include mounting tabs 262 and resilient fingers 264. Illustratively, mounting member 260 includes two mounting tabs 262 and three resilient fingers 264. Resilient fingers 264 are configured to receive a portion of forward frame rails 88 such that resilient fingers 264 snap onto forward frame rails 88. Alternatively, fasteners, such as bolts, rivets, or welds, may be used to secure mounting member 260 to forward frame rail 88. Mounting tabs 262 include apertures for coupling with roll cage assembly 200, as detailed further herein. In one embodiment, mounting member 260 is positioned above bracket 112 and is spaced apart therefrom. In an alternative embodiment, mounting member 260 may be coupled to, or integrally formed with, bracket 112.

Forward frame rails 88 include couplers 114 and, as with couplers 62, couplers 114 may be cast members received within forward frame rails 88 and coupled thereto with adhesive, welds, rivets, bolts, or other similar fasteners. Alternatively, couplers 114 may be integrally formed with forward frame rails 88. As shown in FIG. 12A, couplers 114 include a front portion 114a and a rear portion 114b for coupling together forward frame rails 88 and rearward frame rails 126. Rearward frame rails 126 extend rearwardly from forward frame rails 88 and are angled upwardly to couple with upper portion 124a of rearward longitudinal frame tubes 124. In one embodiment, rearward frame rails 126 receive rear portion 114b of couplers 114 therein and fasteners, such as welds, rivets, bolts, and/or adhesive, may be used to secure rear portions 114b within rearward frame rails 126. As with couplers 62, the inner surface of front portion 114a of couplers 114 is complimentary to the outer surface of rear portion 114b of couplers 114. As such, when front and rear portions 114a, 114b are coupled together, the diameter of coupler 114 is approximately equal to the diameter of frame rails 88, 126. Front and rear portions 114a, 114b of couplers 114 include at least one aperture 115 for receiving a fastener therethrough to couple front and rear portions 114a, 114b together.

Intermediate frame portion 54 also includes cross members 94, 96, 98, 128, and 130. Cross member 128 extends between upper portions 124a of rearward longitudinal frame tubes. Cross members 94, 96, and 98 are positioned forward of cross member 128 and are coupled to lower portions 86b of forward longitudinal frame tubes 86. As shown in FIG. 11, cross members 94, 96, and 98 extend between front longitudinally-extending frame members 58 and lower portions 86b of forward longitudinal frame tubes 86. Cross members 94 are positioned forward of cross members 96 and 98. Cross members 98 are positioned rearward of cross members 94 and 96. Cross members 96 may include a bracket 108 for mounting various components of utility vehicle 2.

Additionally, illustrative intermediate frame portion 54 includes a support member 100, which may be generally positioned between front longitudinally-extending frame members 58 and cross members 94. Additionally, a brace 102 may be supported between front longitudinally-extending frame members 58 and may be positioned rearward of cross members 94. A brace 104 is illustratively supported between front longitudinally-extending frame members 58 and cross members 96. Similarly, a brace 106 is supported between front longitudinally-extending frame members 58 and cross members 98.

Cross members 130 are positioned rearward of cross members 94, 96, and 98, and are coupled to lower portions 86b of forward longitudinal frame tubes 86 and rear longitudinally-extending frame members 60. A brace 134 may be supported between rear longitudinally-extending frame members 60 and cross members 130. Cross members 130 also are coupled to support members 132. Support members 132 extend rearwardly and couple with cross members 136 and braces 138.

As shown in FIGS. 13 and 14, intermediate frame portion 54 also includes front seating section 140 and rear seating section 150. Rear seating section 150 is rearward of front seating section 140 and may be elevated relative to front seating section 140 in order to allow rear passengers to see ahead over the operator and the front passenger. Illustratively, front and rear seating sections 140 and 150 are at the same height relative to the ground surface.

Front seating section 140 includes a forward seat rail 142, a rearward seat rail 144, channel members 145 extending therebetween, and a floorboard assembly 309. Forward seat rail 142 is generally parallel to rearward seat rail 144. Forward seat rail 142 includes a bar 141 for securing the front portion of seats 270 to frame assembly 50. Forward seat rail 142 is coupled to brackets 110 and/or forward frame rails 88 with fasteners 149. Forward seat rail 142 also is coupled to a lever support member 148 for shift lever 24. Lever support member 148 is coupled to rearward seat rail 144 through a support member 146.

Rearward seat rail 144 is coupled to brackets 112 and/or forward frame rails 88. More particularly, as shown in FIG. 14, rearward seat rail 144 includes coupling members 147, which couple to rearward seat rail 144 and brackets 112 with fasteners 149. Illustratively, coupling members 147 are removably coupled to an inner side of brackets 112. Rearward seat rail 144 also includes pins 143 for coupling seat 270 to frame assembly 50. In one embodiment, pins 143 allow seats 270 to be removed from front seating section 140 because pin 143 is detachably coupled to seat 270. Rearward seat rail 144 also may include brackets 159 for supporting a hip or other portion of seat belt assembly 290.

Rear seating section 150 is shown best in FIGS. 9 and 10. Illustrative rear seating section 150 includes a forward seat rail 152, a rearward seat rail 154, channel members 155 extending therebetween, and a floorboard assembly 310. Forward seat rail 152 includes a bar 151 for securing the front portion of rear seats 270 to frame assembly 50. Forward seat rail 152 is coupled to brackets 110 and/or rearward frame rails 126 with fasteners.

Rearward seat rail 154 is coupled to upstanding braces 160 and includes pins 153 for detachably coupling seat 270 to frame assembly 50. Rearward seat rail 154 also may include brackets 157 for supporting a hip or other portion of seat belt assembly 290.

Referring to FIGS. 9-11, rear frame portion 56 includes upstanding members 162, a cross member 164, rear frame members 166, and angled members 168. Upstanding members 162 are coupled to rear longitudinally-extending frame members 60 and cross member 128. Additionally, upstanding members 162 are coupled to angled members 168, which extend between upstanding members 162 and upper portion 124a of rearward longitudinal frame tubes 124. Upstanding members 162 may include a support plate 170.

Cross member 128 of intermediate frame portion 54 also is coupled to rear frame members 166, which include an upstanding portion 166a and a longitudinal portion 166b. More particularly, longitudinal portion 166b of rear frame members 166 are coupled to cross member 128 and a cargo box support assembly 174. Longitudinal portions 166b may include brackets 172 for coupling with roll cage assembly 200, as detailed further herein. Upstanding portion 166a of rear frame members 166 are coupled to rear longitudinally-extending frame members 60 and support a cross bar 176 and a bracket assembly 178. Cross bar 176 and bracket assembly 178 support various components at rear end 16 of utility vehicle 2, for example tail lights, cargo box 340, tie-downs, and/or a trailer hitch.

Figure 15:
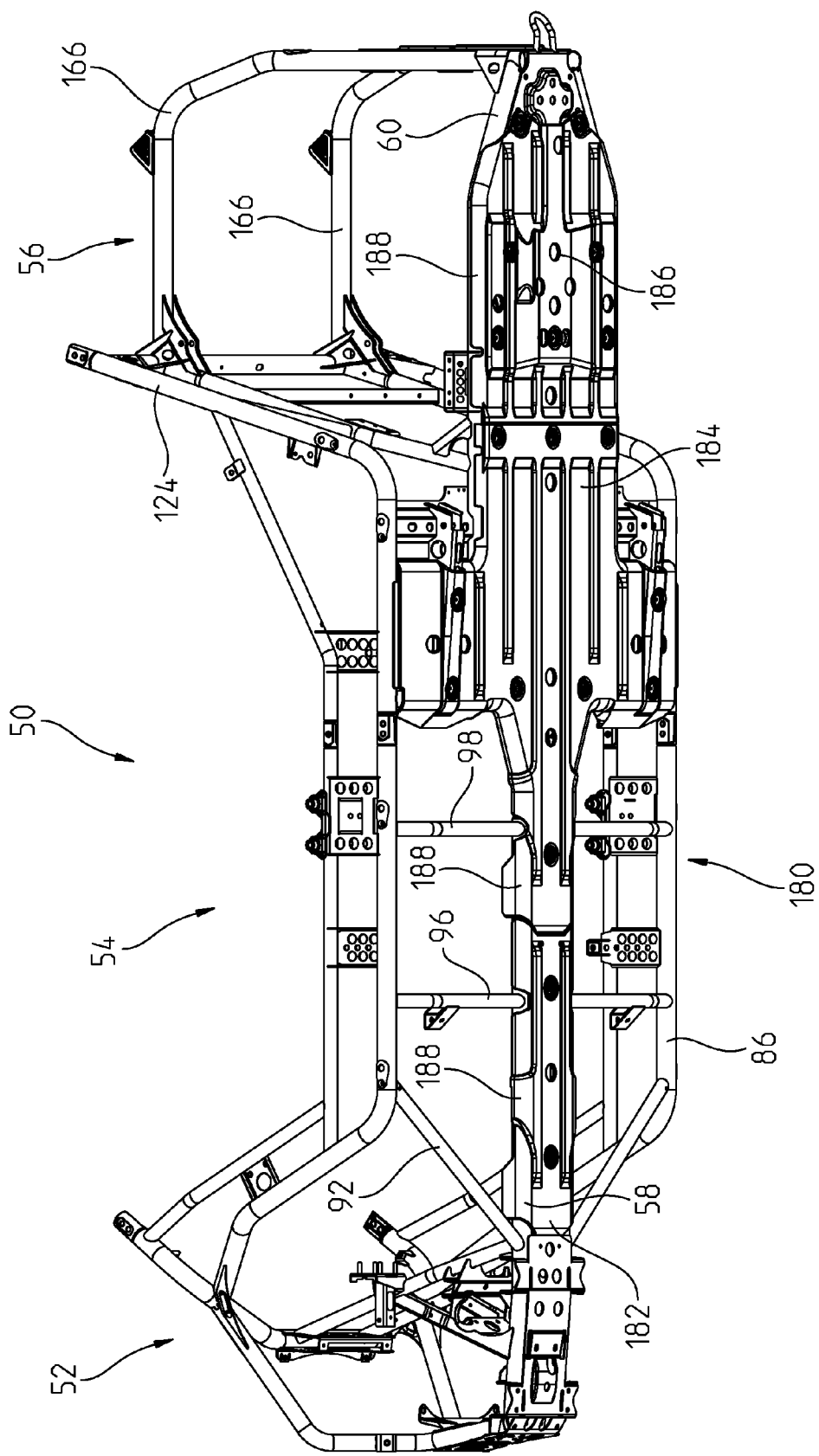
FIG. 15 is a left bottom perspective view of the frame assembly of FIG. 9, illustrating a skid plate assembly.
Figure 16:
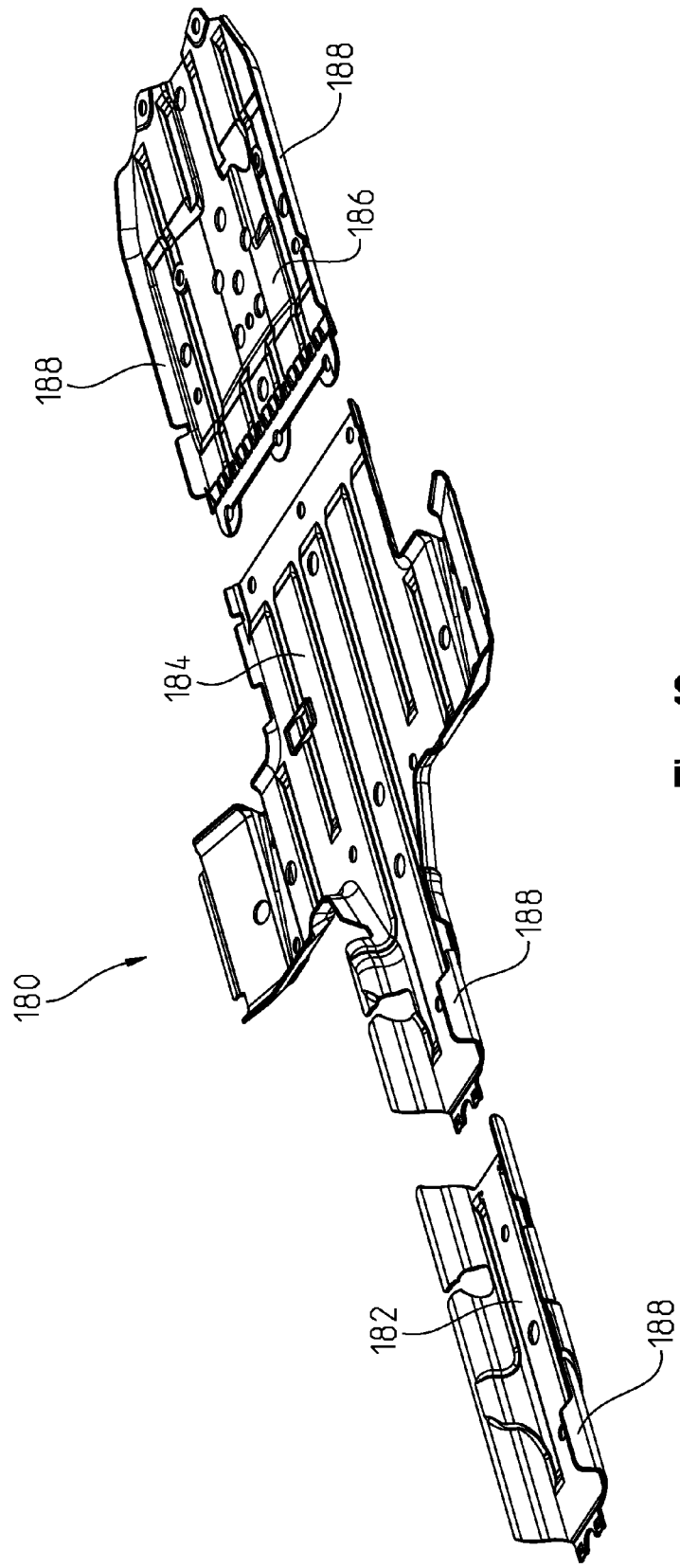
FIG. 16 is an exploded view of the skid plate assembly of FIG. 15.
Figure 17:
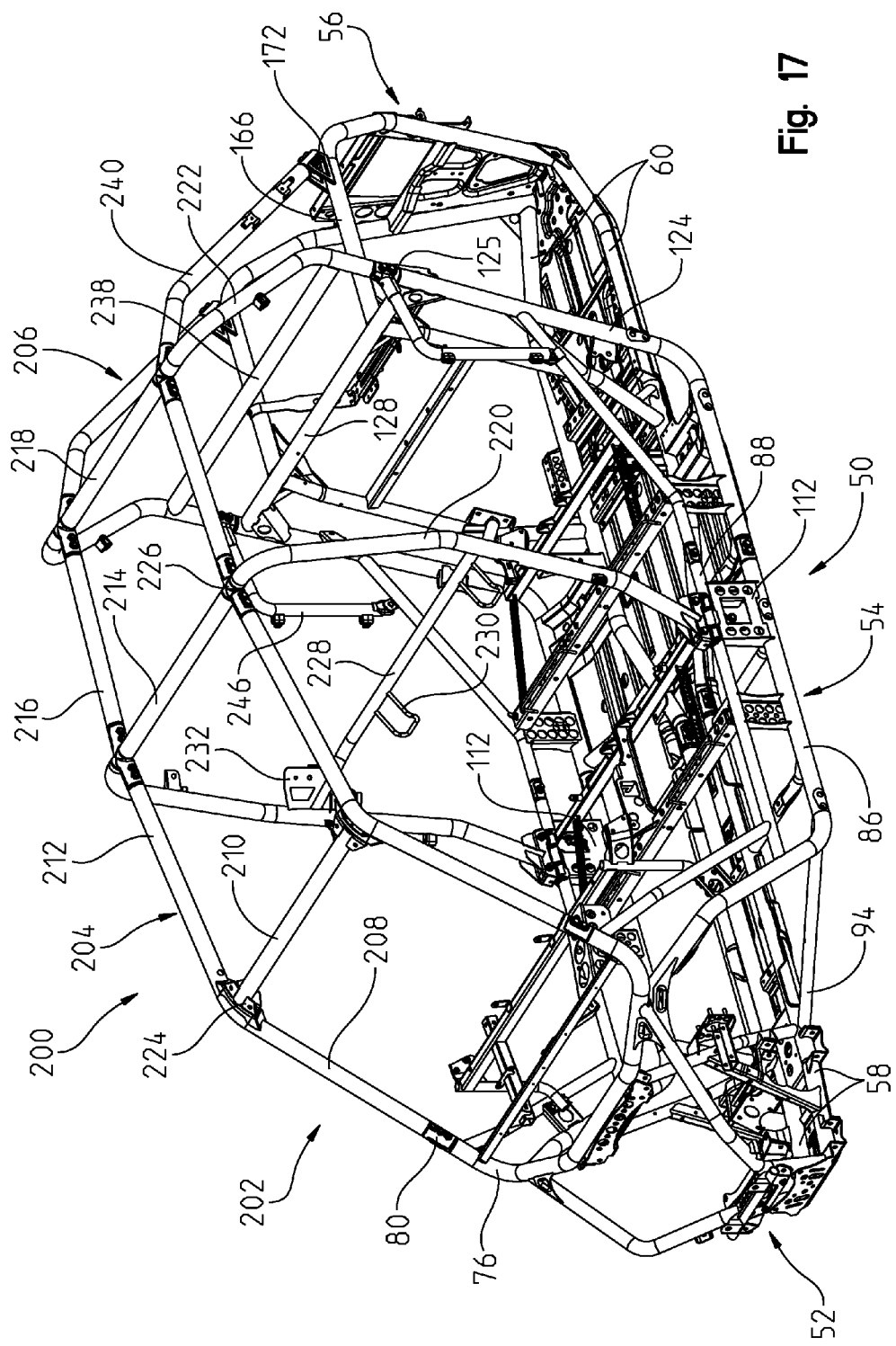
FIG. 17 is a left front perspective view of the frame assembly of FIG. 9 coupled to a roll cage assembly.
Figure 18:
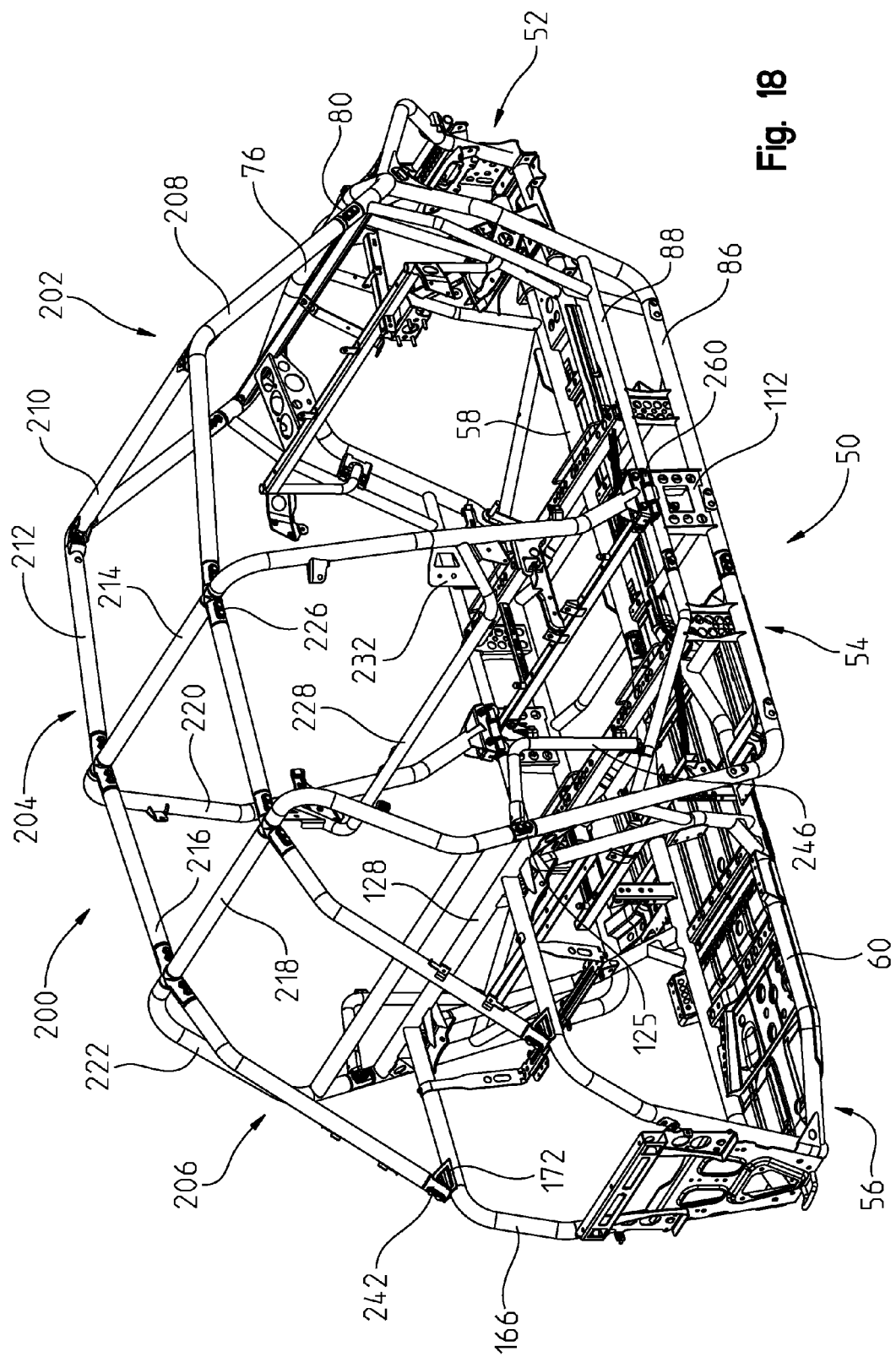
FIG. 18 is a right rear perspective view of the frame assembly and roll cage assembly of FIG. 17.
Figure 19:
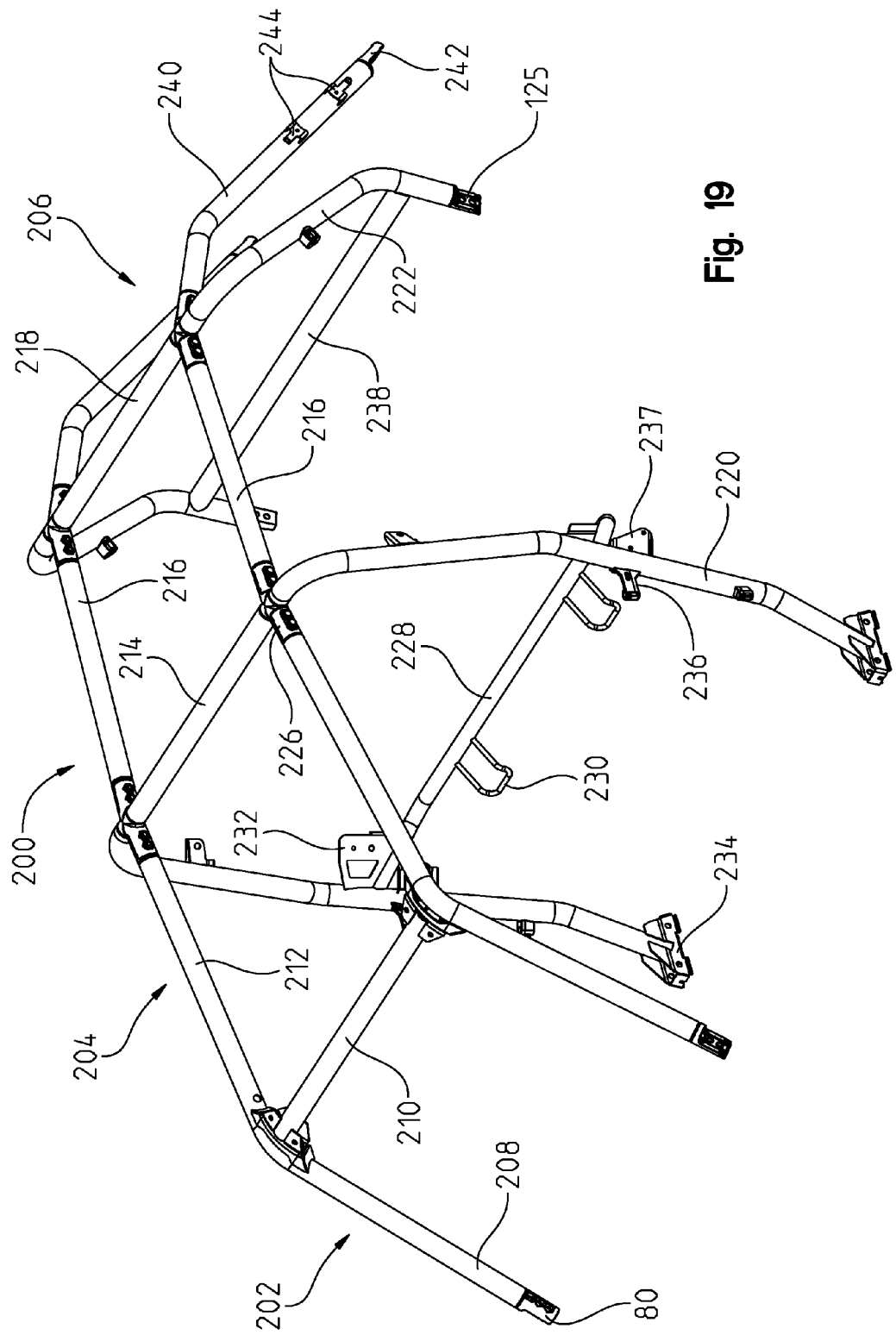
FIG. 19 is a left front perspective view of the roll cage assembly of FIG. 17.

Referring to FIGS. 15 and 16, frame assembly 50 also includes a skid plate assembly 180 for supporting various members of utility vehicle 2 and for protecting powertrain assembly 40 and other components of utility vehicle 2. Skid plate assembly 180 illustratively includes a front skid plate 182, an intermediate skid plate 184, and a rear skid plate 186, which generally correspond to front frame portion 52, intermediate frame portion 54, and rear frame portion 56, respectively. In one embodiment, front, intermediate, and rear skid plates 182, 184, and 186 are removably coupled to each other; however, in alternative embodiments of utility vehicle 2, skid plate assembly 180 may be a unitary component. Front, intermediate, and rear skid plates 182, 184, and 186 include resilient fingers 188 which extend partially around front and rear longitudinally-extending frame members 58, 60. In other words, resilient fingers 188 snap onto front and rear longitudinally-extending frame members 58, 60.

Referring to FIGS. 17-26, roll cage assembly 200 is coupled to frame assembly 50 and includes a front roll cage portion 202, an intermediate roll cage portion 204, and a rear roll cage portion 206. Front roll cage portion 202 includes upstanding members 208 coupled to upper frame member 76 of intermediate frame portion 54 with couplers 80. Couplers 80 may be cast members configured to support front roll cage portion 202 on frame assembly 50. Upstanding members 208 are angled rearwardly toward intermediate roll cage portion 204 and are generally parallel to each other.

Intermediate roll cage portion 204 includes a front cross member 210, front longitudinal members 212, an intermediate cross member 214, rear longitudinal members 216, a rear cross member 218, forward upstanding members 220, and rearward upstanding members 222. Intermediate roll cage portion 204 also may include at least bolster bars 246 for retaining the rear passengers in utility vehicle 2. Additional bolster bars 246 may be included to retain the operator and front passenger in utility vehicle 2.

Front cross member 210 is coupled to front longitudinal members 212. Brackets 224 may be included on intermediate roll cage portion 204 to facilitate the coupling between front cross member 210 and front longitudinal members 212. Alternatively, front cross member 210 may be integrally formed with front longitudinal members 212.

Front longitudinal members 212 extend rearwardly from front cross member 210 to couple with intermediate cross member 214 through a coupler assembly 226, as detailed further herein. Intermediate cross member 214 also is coupled to forward upstanding members 220 through coupler assembly 226. Forward upstanding members 220 extend laterally outward from intermediate cross member 214 and are angled in a generally rearward direction therefrom. A lower end of forward upstanding members 220 includes a mounting bracket 234 for coupling to mounting members 260 of intermediate frame portion 54, as detailed further herein. Forward upstanding members 220 also may support hinges 236 and latch mounts 237 for a door assembly 350, as detailed further herein.

A cross bar 228 extends between forward upstanding members 220 and may include latching members 230 for coupling accessories and/or other components of utility vehicle 2 to roll cage assembly 200. For example, latching members 230 may be configured to support a portion of seats 270. Additionally, forward upstanding members 220 and cross bar 228 also support a retractor mount 232 for seat belt assembly 290. Cross bar 228 also functions as a grab bar for the rear passengers during operation of utility vehicle 2.

Rear longitudinal members 216 are positioned rearward of intermediate cross member 214 and forward upstanding members 220. Rear longitudinal members 216 also are coupled to coupler assemblies 226 and extend rearwardly to couple with rear cross member 218. Rear cross member 218 is coupled to rearward upstanding members 222 through coupler assemblies 226.

Rearward upstanding members 222 extend laterally outward from rear cross member 218 and are angled in a generally rearward direction therefrom. Rearward upstanding members 222 may be coupled to upper portion 124a of rearward longitudinal frame tubes 124 with couplers 125. Couplers 125 may be cast members configured to support roll cage assembly 200 on frame assembly 50. A cross bar 238 extends between rearward upstanding members 222.

As shown in FIGS. 17-20, rear roll cage portion 206 includes members 240, which are angled rearwardly and downwardly from rear cross member 218. Members 240 include couplers 242, which are similar to couplers 80 and 125 detailed herein, and may be cast components configured to couple with brackets 172 on longitudinal portions 166b of rear frame members 166. Members 240 also may include mounts 244 for supporting various accessories and/or components of utility vehicle 2 on roll cage assembly 200.

Figure 21:
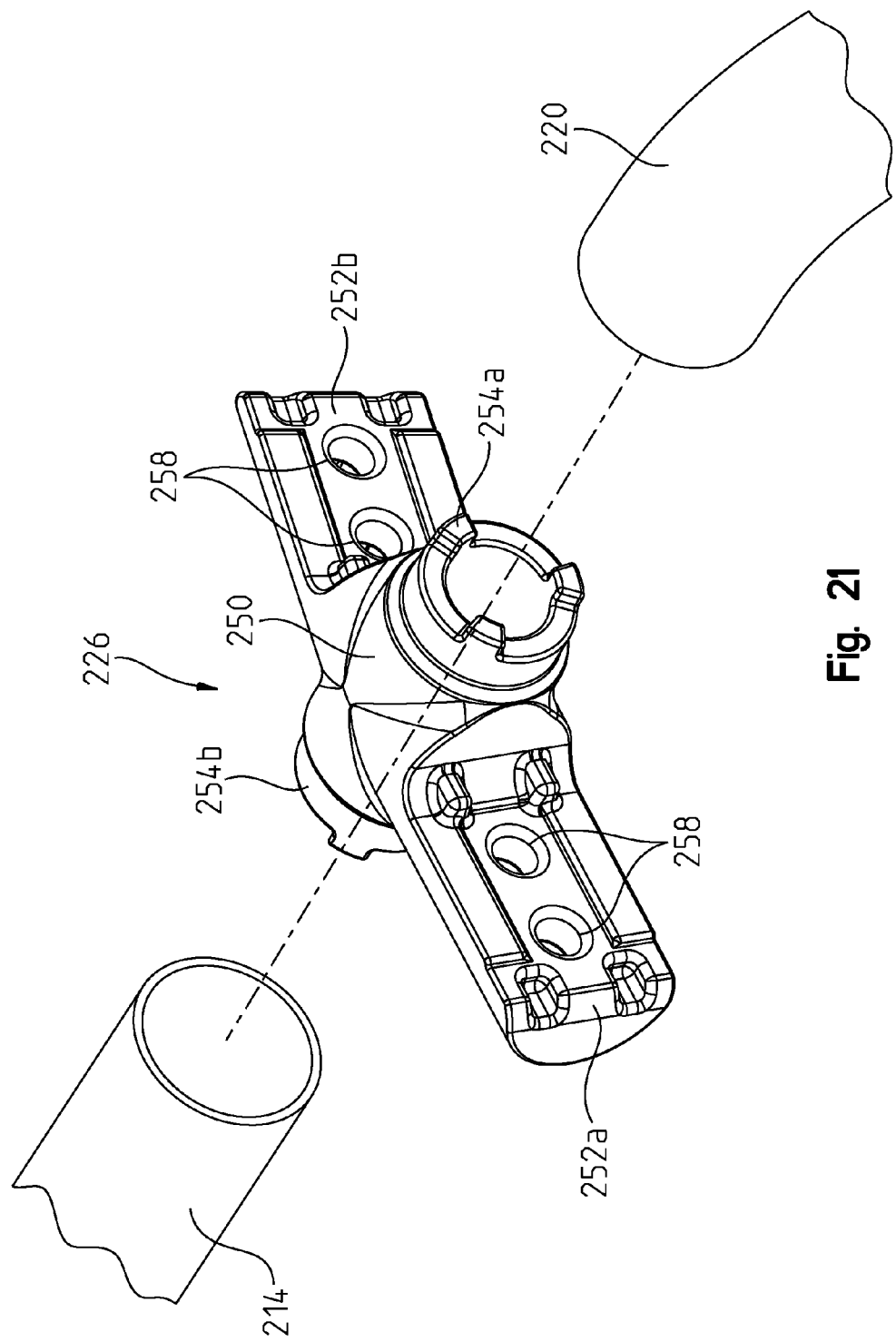
FIG. 21 is a detailed view of a coupler of the roll cage assembly of FIG. 20.
Figure 22:
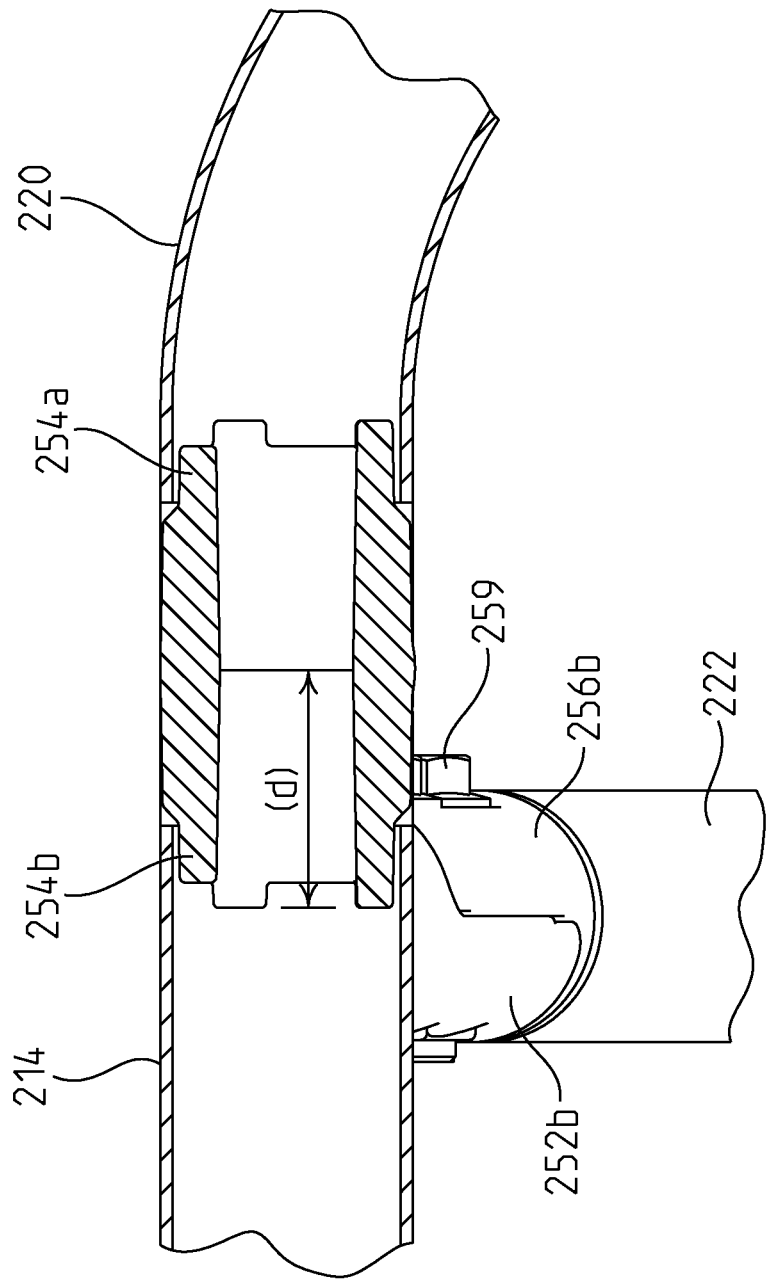
FIG. 22 is a cross-sectional view of the coupler of FIG. 21.

Referring to FIGS. 21 and 22, coupler assembly 226 includes a coupling body 250 that has coupling tabs 252 and coupling ends 254. More particularly, coupling body 250 includes a forward-facing coupling tab 252a, a rearward-facing coupling tab 252b, an outer coupling end 254a, and an inner coupling end 254b. Forward-facing coupling tab 252a is generally opposite rearward-facing coupling tab 252b and is generally perpendicular to coupling ends 254. Coupling body 250 is configured to join together four members of roll cage assembly 200. Illustratively, roll cage assembly 200 includes four coupler assemblies 226. Similar to couplers 62, 80, and 125, coupler assembly 226 is comprised of cast components that may be coupled to roll cage assembly 200 with welds, adhesive, rivets, bolts, or other fasteners. In other embodiments, coupler assembly 226 may be integrally formed with roll cage assembly 200.

Forward-facing coupling tab 252a is configured to couple with a coupling tab 256a extending rearwardly from front longitudinal members 212 and rear longitudinal members 216. The outer surface of forward-facing coupling tab 252a is generally complimentary to the inner surface of coupling tab 256a such that the diameter of tabs 252a and 256a, when joined together, is approximately the same as the diameter of longitudinal members 212 and 216.

Similarly, rearward-facing coupling tab 252b is configured to couple with a coupling tab 256b extending forwardly from rear longitudinal members 216 and members 240 of rear roll cage portion 206. The outer surface of rearward-facing coupling tab 252b is generally complimentary to the inner surface of coupling tab 256b such that the diameter of tabs 252b and 256b, when joined together, is approximately the same as the diameter of rear longitudinal members 216 and members 240. Coupling tabs 252 and 256 each include a plurality of apertures 258 which are configured to receive fasteners 259.

Figure 20:
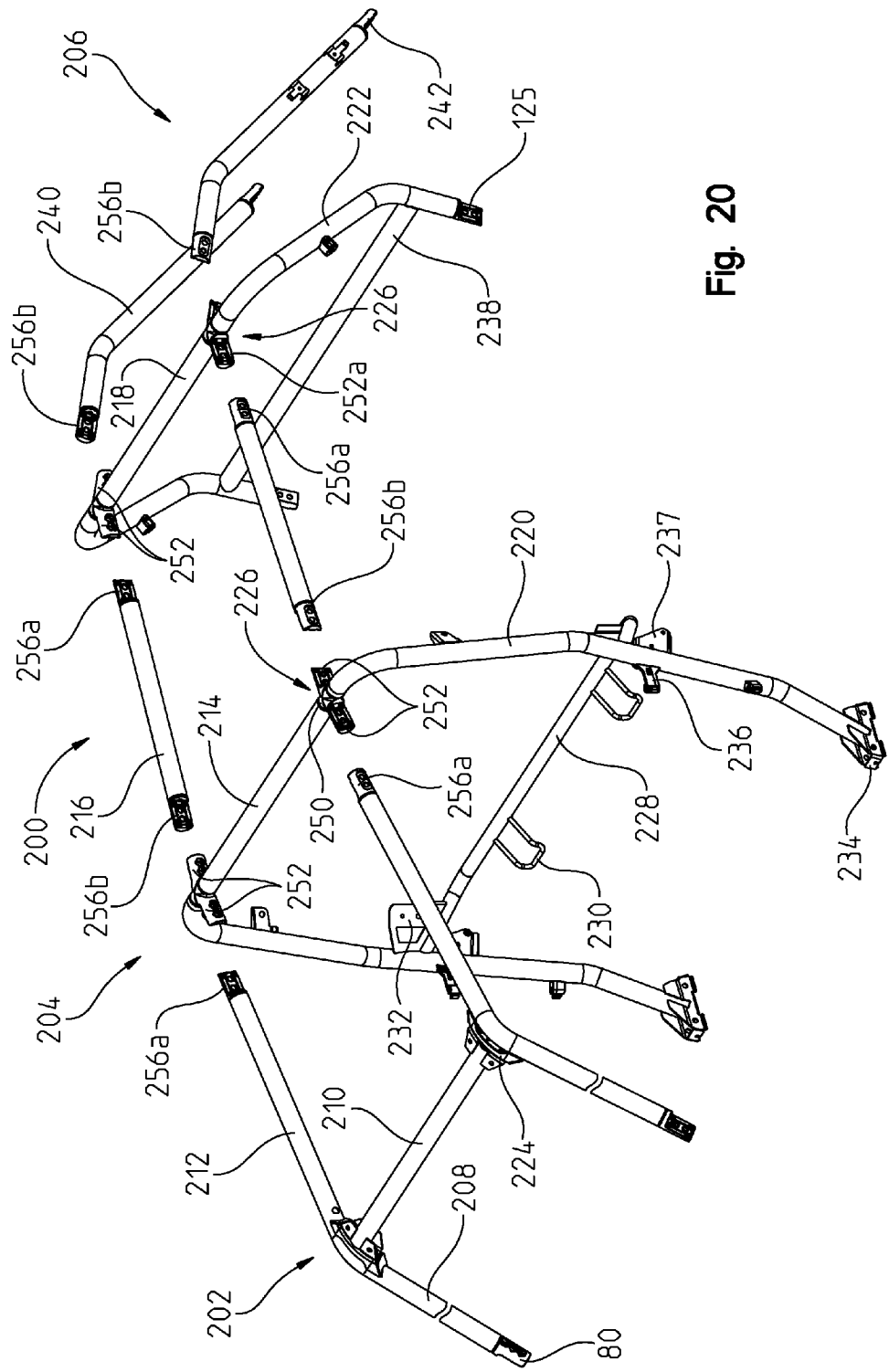
FIG. 20 is an exploded view of the roll cage assembly of FIG. 19.

Coupling ends 254 are configured to be received in intermediate cross member 214, rear cross member 218, forward upstanding members 220, and rearward upstanding members 222. More particularly, as shown in FIGS. 20-22, outer coupling end 254a is configured to be received within forward upstanding members 220 and rearward upstanding members 222. Generally opposite outer coupling end 254a, inner coupling end 254b is configured to be received within intermediate cross member 214 and rear cross member 218.

As shown in both FIGS. 22 and 25, rear longitudinal members 216 are angled inwardly from intermediate cross member 214. As such, the forward end of rear longitudinal member 216 is laterally offset from the rearward end thereof by a distance (d), as shown in FIG. 22. In this way, the distance between the forward ends of rear longitudinal members 216 is greater than the distance between the rearward ends thereof.

Figure 23:
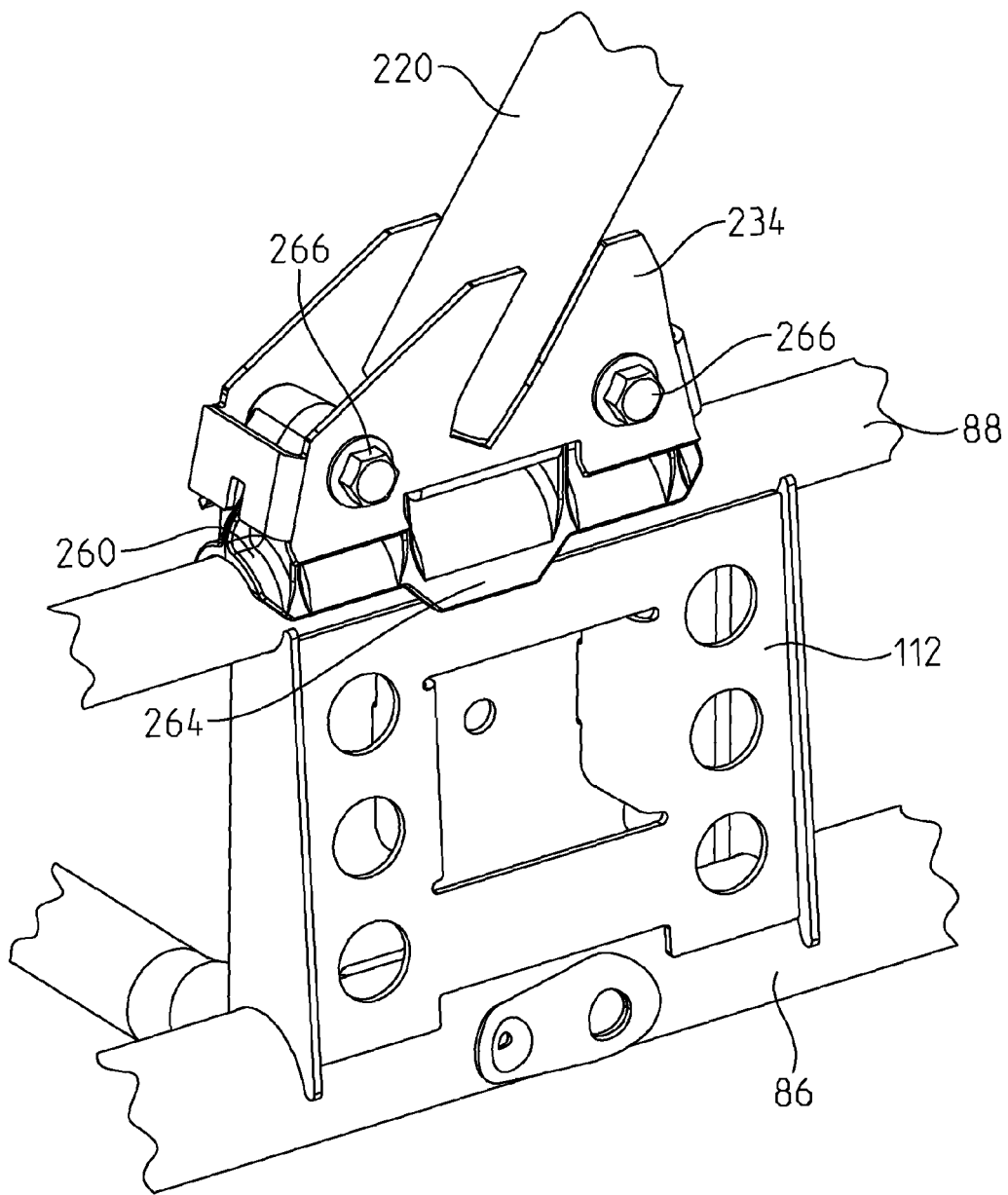
FIG. 23 is a detailed right rear perspective view of the connection between a portion of the roll cage assembly and a portion of the frame assembly.
Figure 24:
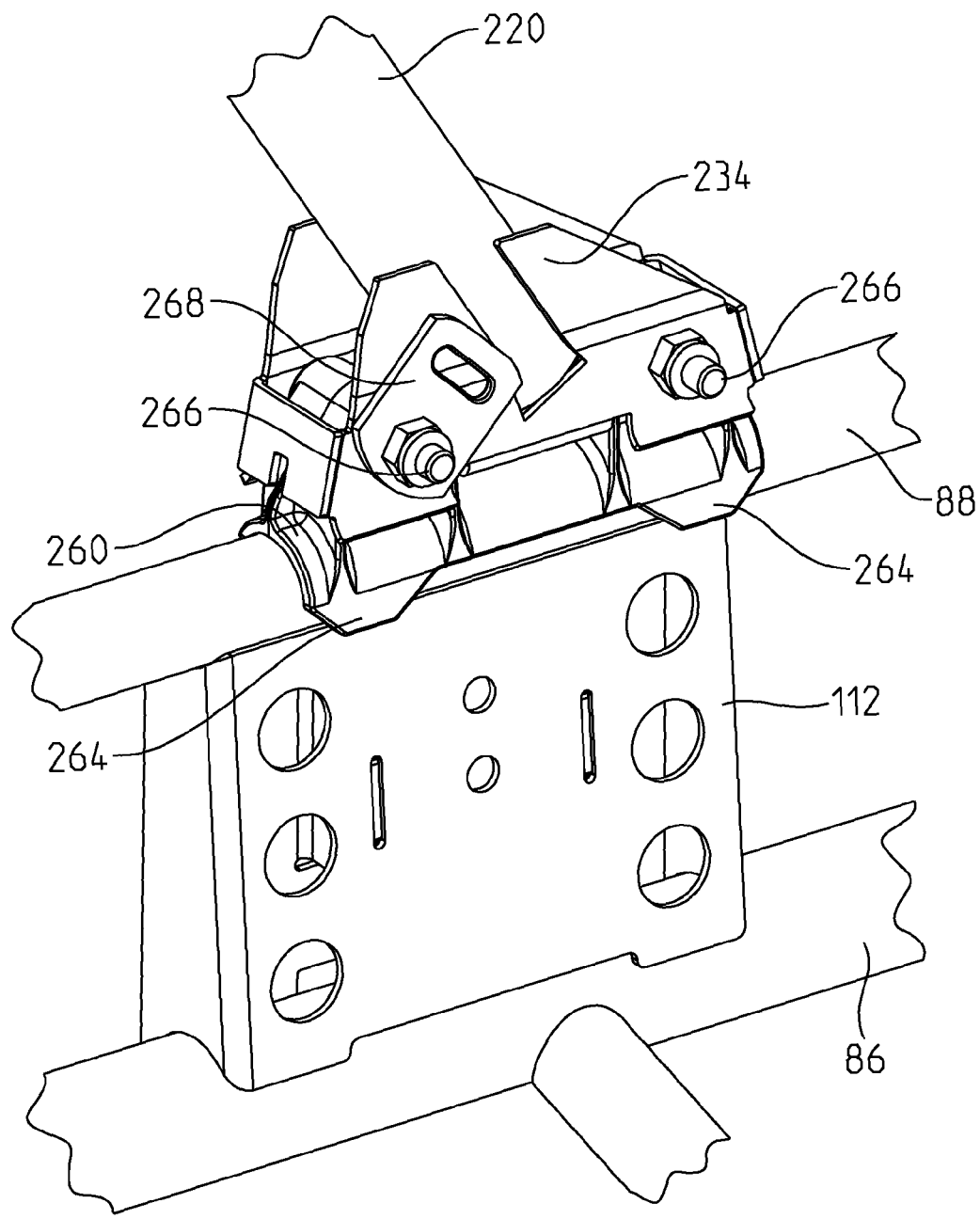
FIG. 24 is a further detailed right rear perspective view of the connection of FIG. 23.

Referring to FIGS. 23-25, forward upstanding members 220 are coupled to mounting members 260 of intermediate frame portion 54 through mounting brackets 234. More particularly, mounting bracket 234 is received over mounting tabs 262 of mounting member 260 such that the apertures in tabs 262 are aligned with the apertures in mounting bracket 234. Fasteners 266 are received through the apertures in mounting bracket 234 and tabs 262 in order to couple forward upstanding members 220 to frame assembly 50. Mounting bracket 234 may include a plate member 268. Plate member 268 may be configured to reinforce, align, or support the connection between roll cage assembly 200 and frame assembly 50. Alternatively, plate member 268 may be configured to support various components or accessories of utility vehicle 2, for example a portion of seat belt assembly 290. In one embodiment, plate member 268 may support the webbing of seat belt assembly 290.

Mounting bracket 234 and mounting member 260 may be cast components coupled to forward upstanding members 220 and forward frame rails 88 with adhesive, welds, rivets, bolts, or other fasteners. Alternatively, mounting bracket 234 and mounting member 260 may be stamped components. Illustratively, mounting bracket 234 on forward upstanding members 220 is a stamped component and mounting member 260 on forward frame rails 88 is a cast component.

Figure 26:
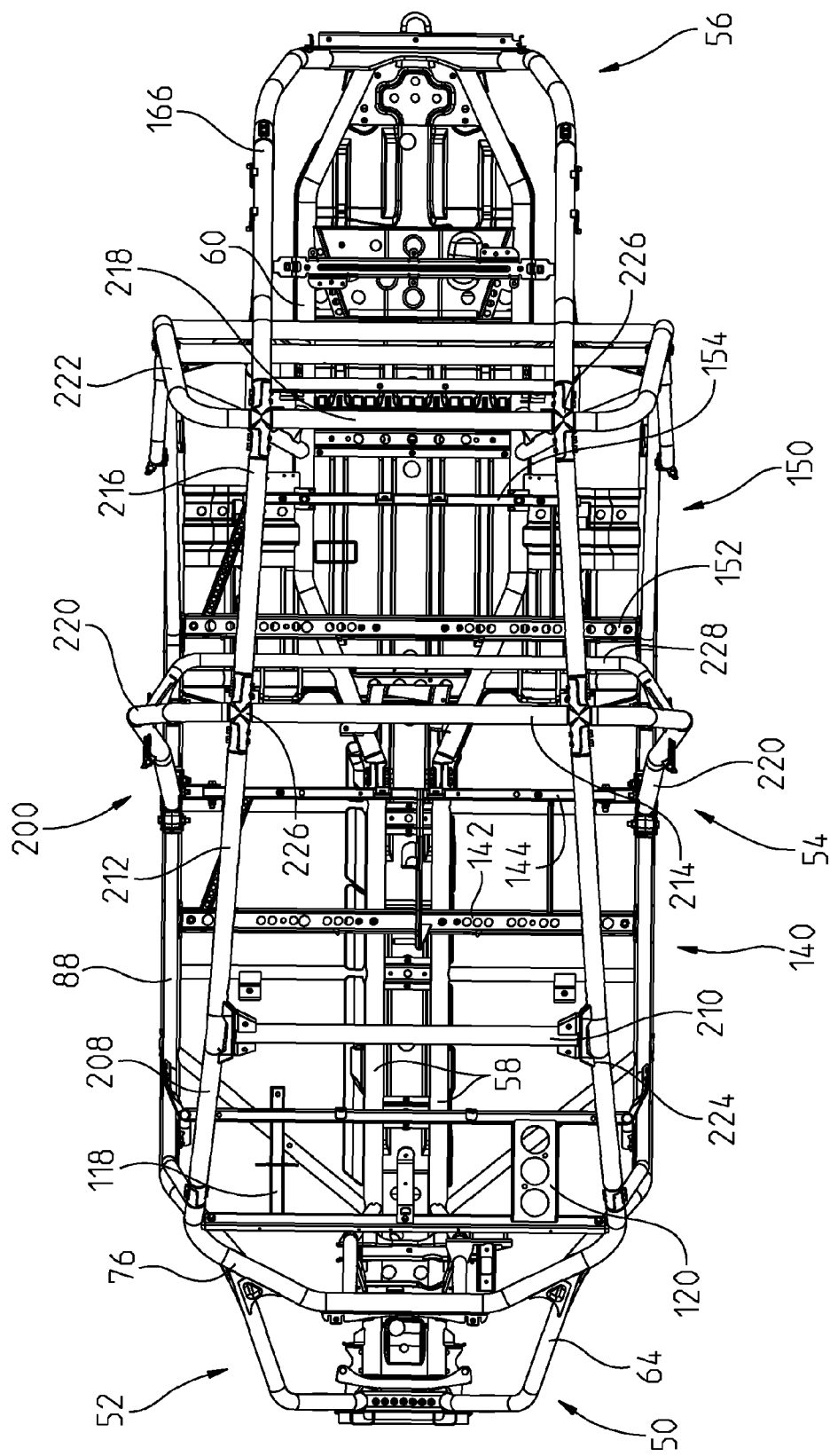
FIG. 26 is a top view of the roll cage assembly and the frame assembly of FIG. 17.
Figure 27:
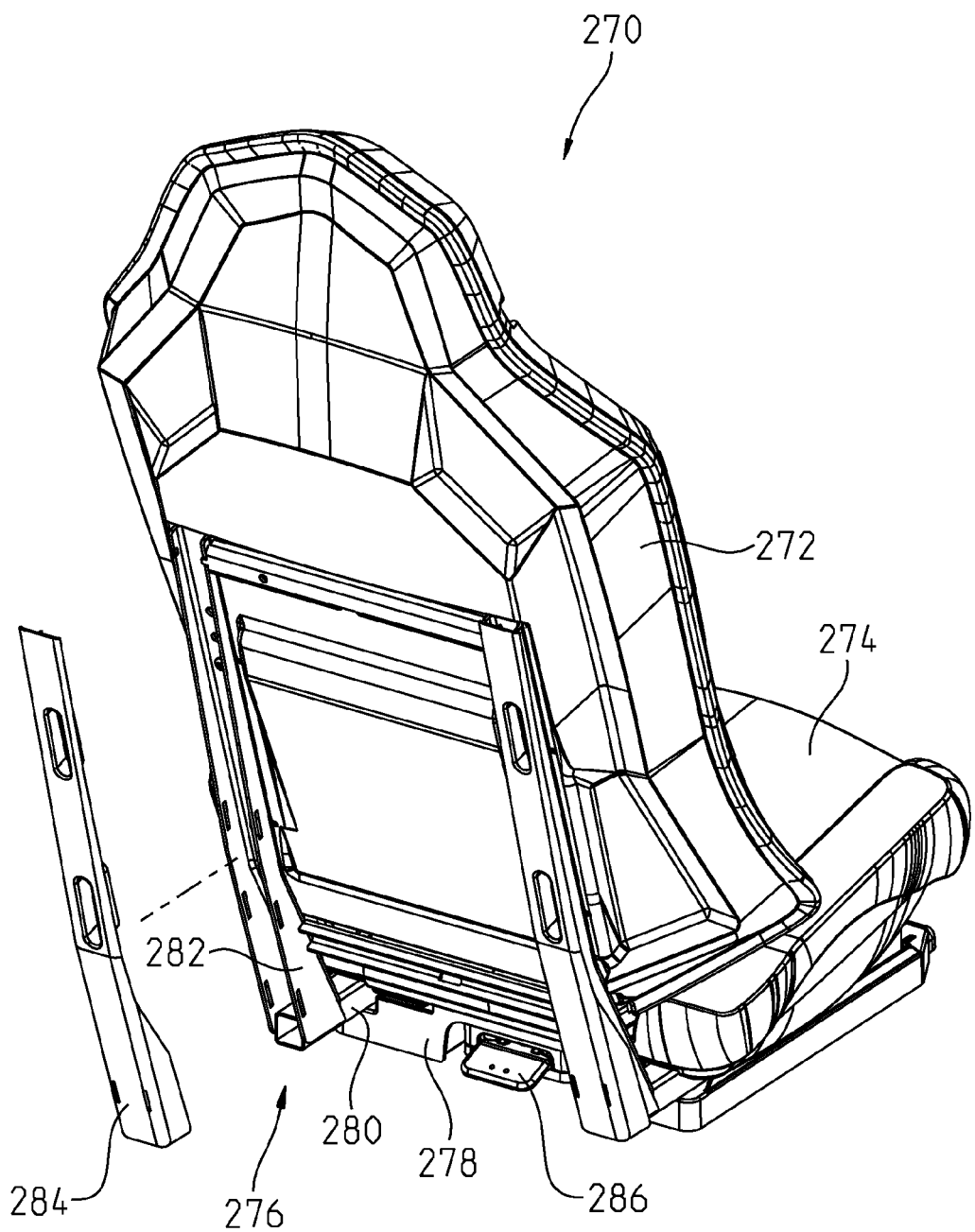
FIG. 27 is a right rear perspective view of a seat of the vehicle of FIG. 1.

As shown in FIG. 26, roll cage assembly 200 is positioned above frame assembly 50 and generally defines operator area 20 therebetween. As detailed herein, operator area 20 includes seats 270 for the operator and up to three passengers. As shown in FIG. 27, seats 270 include a seat back 272, a seat bottom 274, and a seat frame assembly 276. Seat back 272 may be separate from seat bottom 274, or may be integrally formed therewith to define a unitary seat 270.

Seat frame assembly 276 includes a seat base 278, seat rails 280, support members 282, cover members 284, and a lever or handle 286. Seat base 278 is removably coupled to seating sections 140 and/or 150 and, more particularly, to seat rails 142, 144 and/or 152, 154, respectively. Illustratively, seat base 278 is configured to engage pin 143 and/or 153 to couple seat base 278 to frame assembly 50. If it is desired to remove seat 270 from utility vehicle 2, lever 286 may be moved to release the connection between seat base 278 and pin 143 and/or 153, as detailed further in U.S. Patent Application Publication No. 2012/0212013, filed on May 4, 2012, and entitled ATV HAVING ARRANGEMENT FOR A PASSENGER, the complete disclosure of which is expressly incorporated by reference herein.

Seat base 278 is operably coupled to seat rails 280. Seat rails 280 are fixed to seat bottom 274 and are configured to slide or otherwise move relative to seat base 278. As such, the longitudinal position of seats 270 may be adjusted. Seat rails 280 are coupled to support members 282 and cover members 284. Cover members 284 may be configured to snap or clip onto support members 282. Alternatively, cover members 284 may be coupled to support members 282 with conventional fasteners. Cover members 284 include a plurality of apertures that may receive mounting components for securing seat 270 within operator area 20. Additionally, cover members 284 have rounded corners, rather than corners oriented at a sharp 90-degree angle. As such, the rear surface of seat frame assembly 276 that faces the rear passengers is generally smooth to improve the ergonomics for the rear passengers. Additionally, because the rear surface of seat frame assembly 276 is smooth, the rear passengers are less likely to injure their legs if their legs contact seats 270 of front seating section 140 during operation of utility vehicle 2. In one embodiment, cover members 284 are comprised of a polymeric materials, for example rubber.

As shown in FIGS. 28 and 29, seats 270 may include seat belt assembly 290. Seat belt assembly 290 may include a hip refractor, webbing such as a lap belt and/or a shoulder belt, buckle or latch mechanism, and a shoulder retractor 292. Alternatively, seat belt assembly 290 may be configured with a single retractor. In one embodiment, seat belt assembly 290 may be operably coupled to the electrical system of utility vehicle 2, such that the speed of utility vehicle 2 is affected by the status of seat belt assembly 290. For example, the speed of utility vehicle 2 may be limited if a sensor of the electrical system determines that the operator and/or passengers are not using seat belt assembly 290.

The lap belt and/or hip retractor of seat belt assembly 290 may be coupled to mounting bracket 234 and/or mounting member 260. Shoulder retractors 292 are coupled to roll cage assembly 200 and, more particularly, shoulder retractors 292 for seats 270 in front seating section 140 may be coupled to forward upstanding members 220 and shoulder retractors 292 for seats 270 in rear seating section 150 may be coupled to rearward upstanding members 222, cross bar 228, and/or cross bar 238.

Shoulder retractor 292 includes a retractor body 294, a shoulder belt 296, a fastener 298, and a pin 300. Retractor body 294 houses shoulder belt 296 and also prevent tampering with shoulder belt 296. Fastener 298 is illustratively a threaded bolt which is received through an aperture 302 of retractor mount 232. A fastener 304, illustratively a threaded nut, is coupled to fastener 298 to secure refractor body 294 to retractor mount 232. Pin 300 of retractor body 294 extends through an aperture 306 of retractor mount 232.

Figure 30:
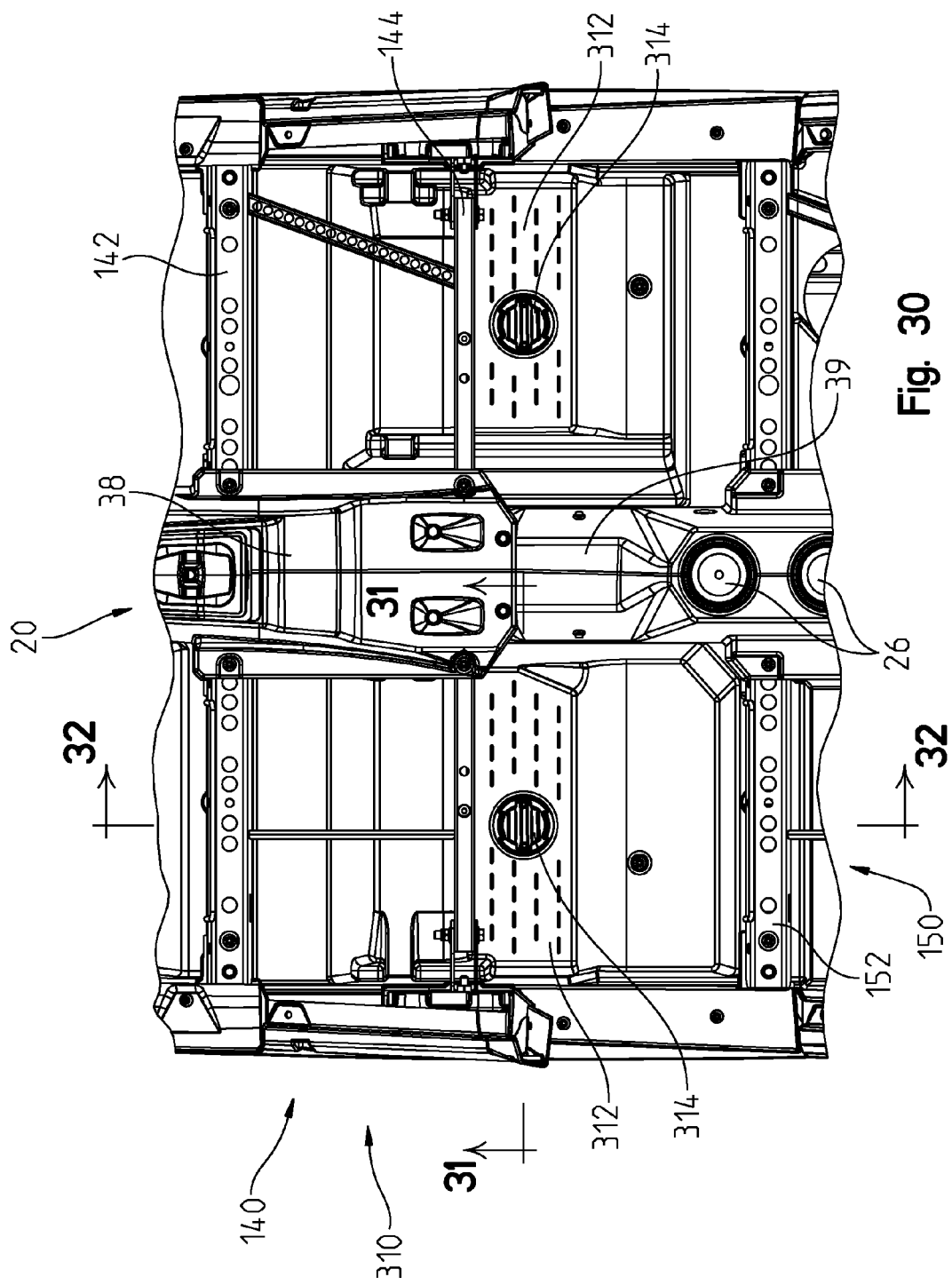
FIG. 30 is a top plan view of an operator area of the vehicle of FIG. 1.
Figure 31:
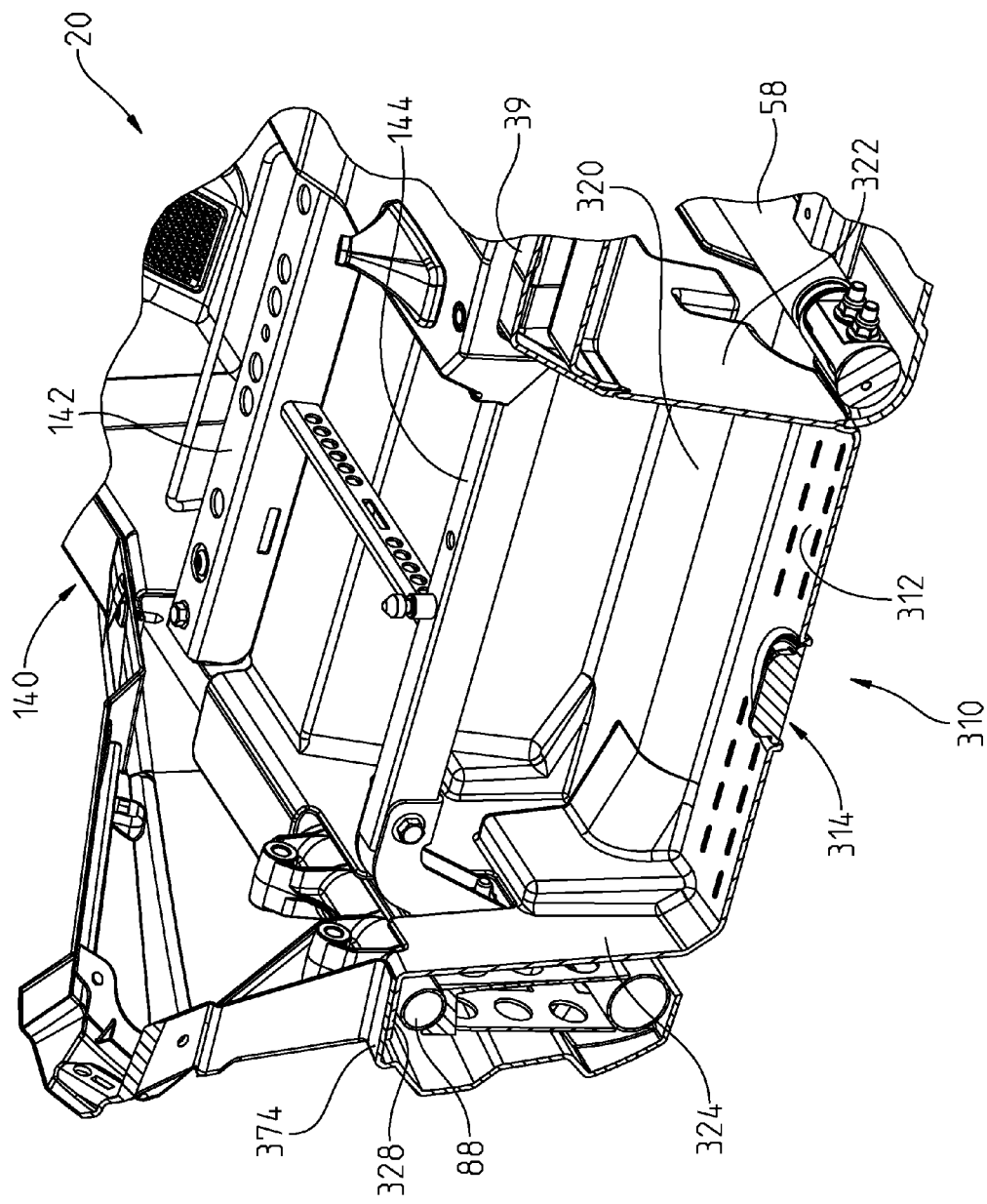
FIG. 31 is a right rear cross-sectional view of a floorboard assembly of the operator area of FIG. 30.
Figure 32:
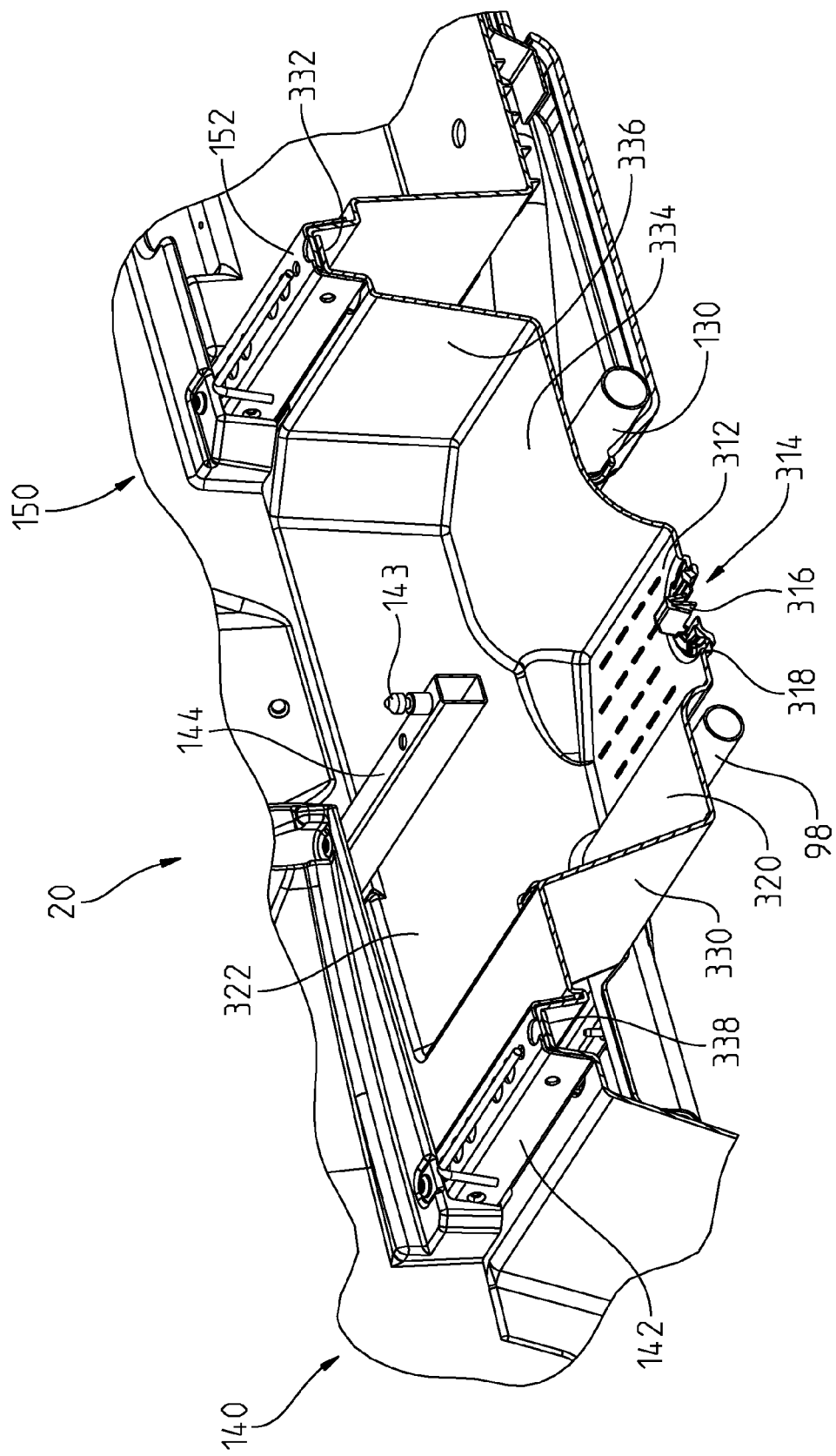
FIG. 32 is a left front cross-sectional view of the floorboard assembly of FIG. 31.

As shown in FIGS. 30-32, while seated on seats 270 in operator area 20, the rear passengers' feet contact floorboard assembly 310 of rear seating section 150. Similarly, the front passengers' feet contact floorboard assembly 309 of front seating section 140. Hereinafter, floorboard assembly 310 of rear seating section 150 is described, however, it may be appreciated that floorboard assembly 309 of front seating section 140 may have a similar configuration to that of floorboard assembly 310. Floorboard assembly 310 includes a floorboard panel 312 and a drain assembly 314. Drain assembly 314 includes a cap 316 that is configured to seal against an aperture 318 in floorboard panel 312. In this way, cap 316 may be removed from aperture 318 to allow fluids, dirt, and other debris to fall through aperture 318 when cleaning operator area 20.

Floorboard panel 312 of rear seating section 150 is integrally formed with, or otherwise coupled to, a front rounded panel 320, a front vertical panel 330, an inner side panel 322, an outer side panel 324, a rear rounded panel 334, and a rear vertical panel 336. As shown in FIGS. 31 and 32, floorboard panel 312 is positioned below frame assembly 50. More particularly, floorboard panel 312 is positioned below the top surface of at least front longitudinally-extending frame members 58, cross members 98, and cross members 130 of frame assembly 50. Additionally, as shown in FIGS. 31 and 32, front rounded panel 320 and front vertical panel 330 are positioned below seats 270 in front seating section 140 and, more particularly, are positioned intermediate seat rails 142 and 144 of front seating section 140. As such, the leg room for the rear passengers is increased because the rear passengers may extend their legs forward and under seats 270 in front seating section 140.

Additionally, the leg room for the rear passengers is increased because of the configuration of coupling members 147 on brackets 112. More particularly, because coupling members 147 are coupled to brackets 112, rather than floorboard panel 312, coupling members 147 do not interfere with the leg room of the rear passengers. In other words, the rear passengers can place their feet on any portion of floorboard panel 312 without interference from other components of front seating section 140. As such, the width of the leg room for the rear passengers is maintained and is not decreased by any component of front seating section 140. In one embodiment, by supporting coupling member 147 on bracket 112, rather than floorboard assembly 310, the rear passengers are afforded an additional 1.5 inches of leg room.

As shown in FIG. 32, front vertical panel 330 includes a lip 338 which is positioned under seat rail 142 of front seating section 140 and is coupled thereto. As such, floorboard assembly 310 is coupled to front seating section 140. Similarly, rear vertical panel 336 includes a lip 332 which is positioned under seat rail 152 of rear seating section 150 in order to couple floorboard assembly 310 to rear seating section 150. Additionally, outer side panel 324 includes a lip 338, which extends over forward frame rail 88 and couples with an outer body panel, illustratively a rocker panel 374. Inner side panel 322 is coupled to rear center console 39.

As shown best in FIG. 31, the cross-sectional profile of rear center console 39 angles inwardly toward the top surface that supports cup holders 26. Illustratively, the contour or profile of rear center console 39 generally defines an upside-down "U" shape. As such, the side walls of rear center console 39 are angled away from floorboard assembly 310. In this way, by angling the rear center console 39 away from floorboard assembly 310, the width of the leg room space for the rear passengers is increased such that the knees or upper legs of the rear passengers may rest against the rear center console 39 and/or inner side panel 322.

Front rounded panel 320, front vertical panel 330, rear rounded panel 334, and rear vertical panel 336 are coupled to inner and outer side panels 322 and 324 to define a foot well for the rear passengers. Front rounded panel 320 and rear rounded panel 334 are angled downwardly toward floorboard panel 312, which may facilitate cleaning floorboard assembly 310. In other words, rounded panels 320 and 334 are angled to direct dirt, debris, and liquids toward drain assembly 314. Additionally, the rounded and angled contour of front rounded panel 320 is configured to provide a dead pedal-type foot rest for the rear passengers to increase the ergonomics and/or stability of the rear passengers. More particularly, front rounded panel 320 may be angled by approximately 50-75 degrees from floorboard panel 312 to provide the rear passengers with a dead pedal and to angle debris, dirt, and fluids toward drain assembly 314. Illustratively, front rounded panel 320 may be angled by approximately 67 degrees relative to floorboard panel 312.

Figure 33:
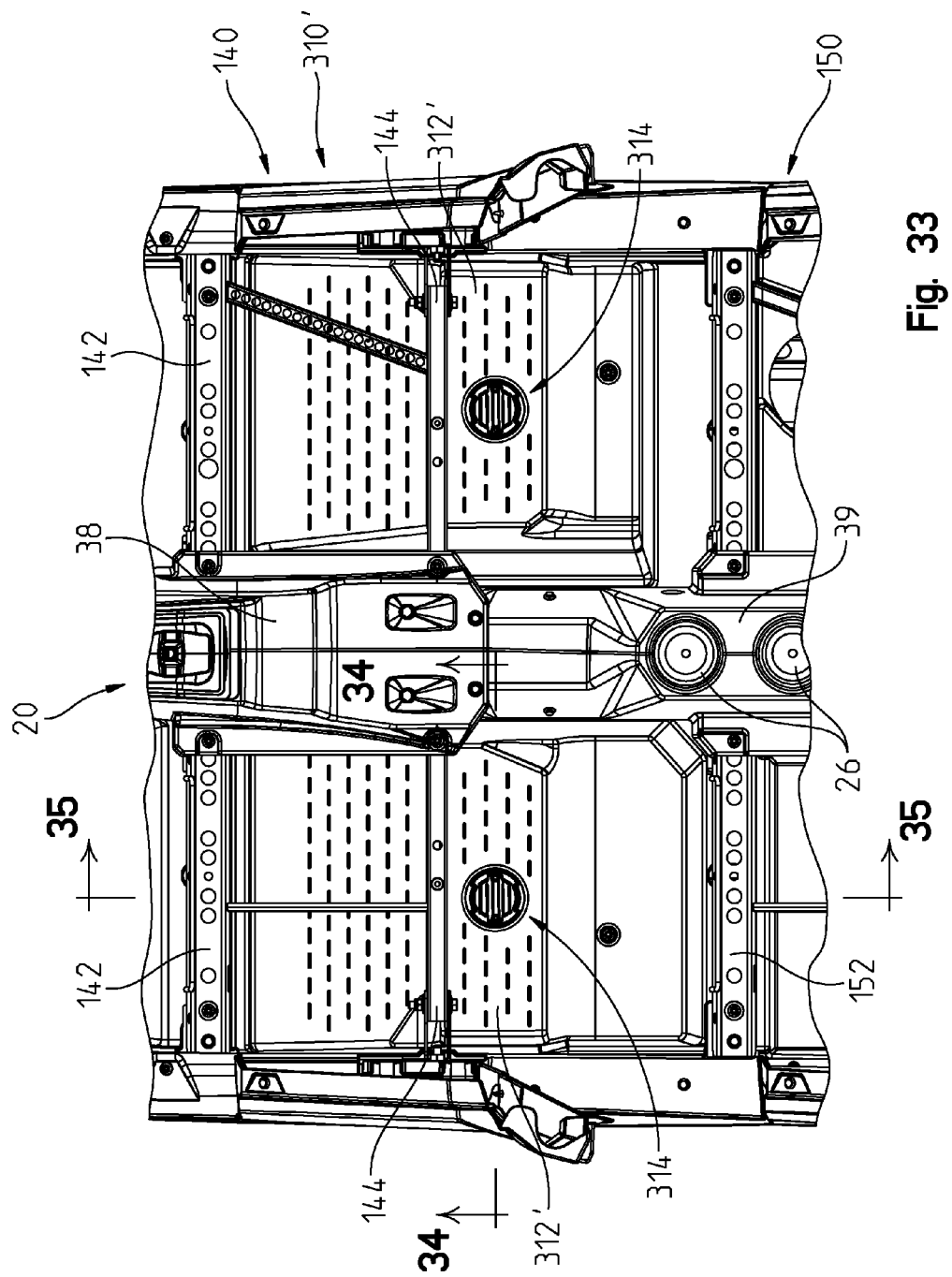
FIG. 33 is a top plan view of an alternative embodiment of the operator area of FIG. 30.
Figure 34:
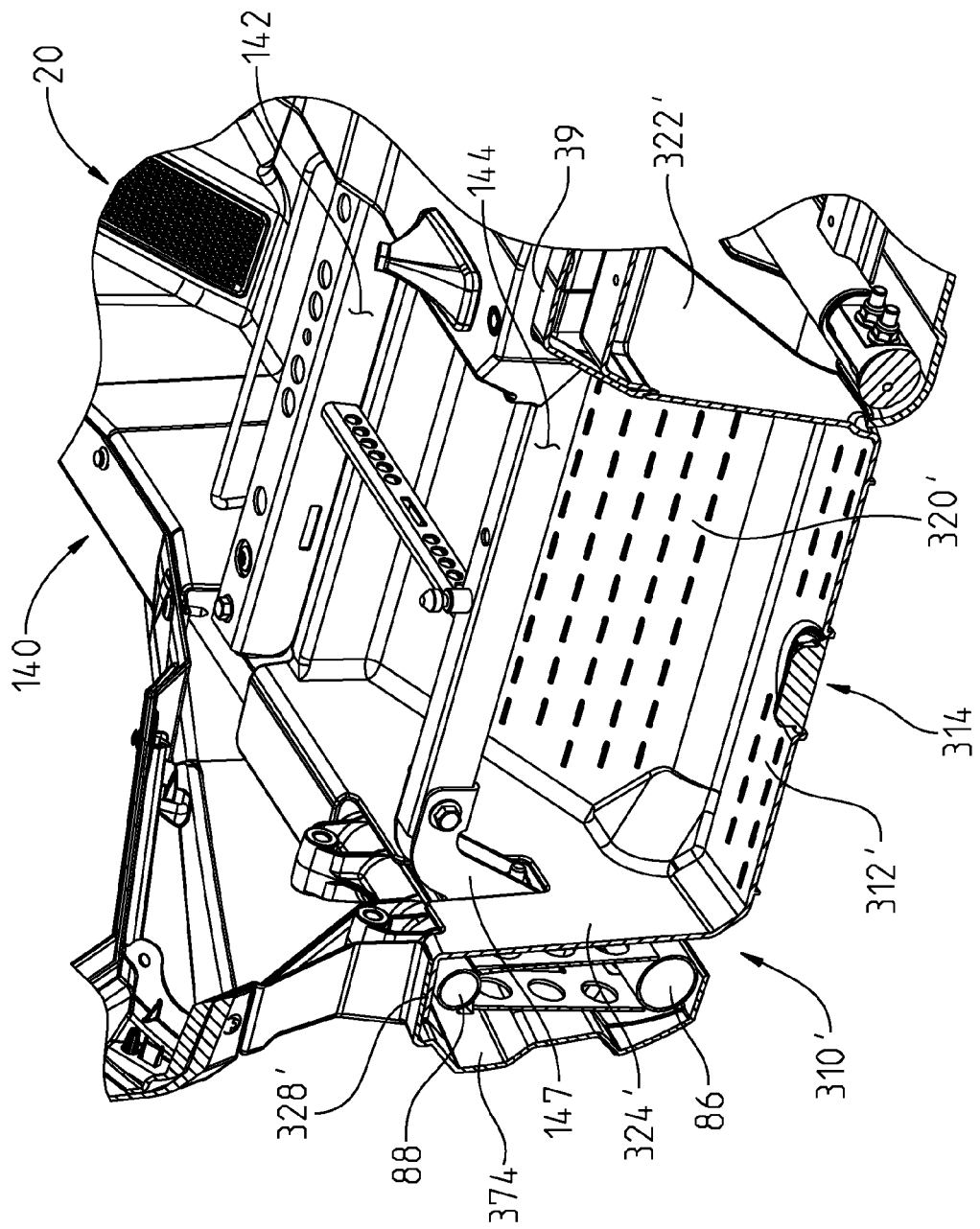
FIG. 34 is a right rear cross-section view of an alternative embodiment of the floorboard assembly of FIG. 31.
Figure 35:
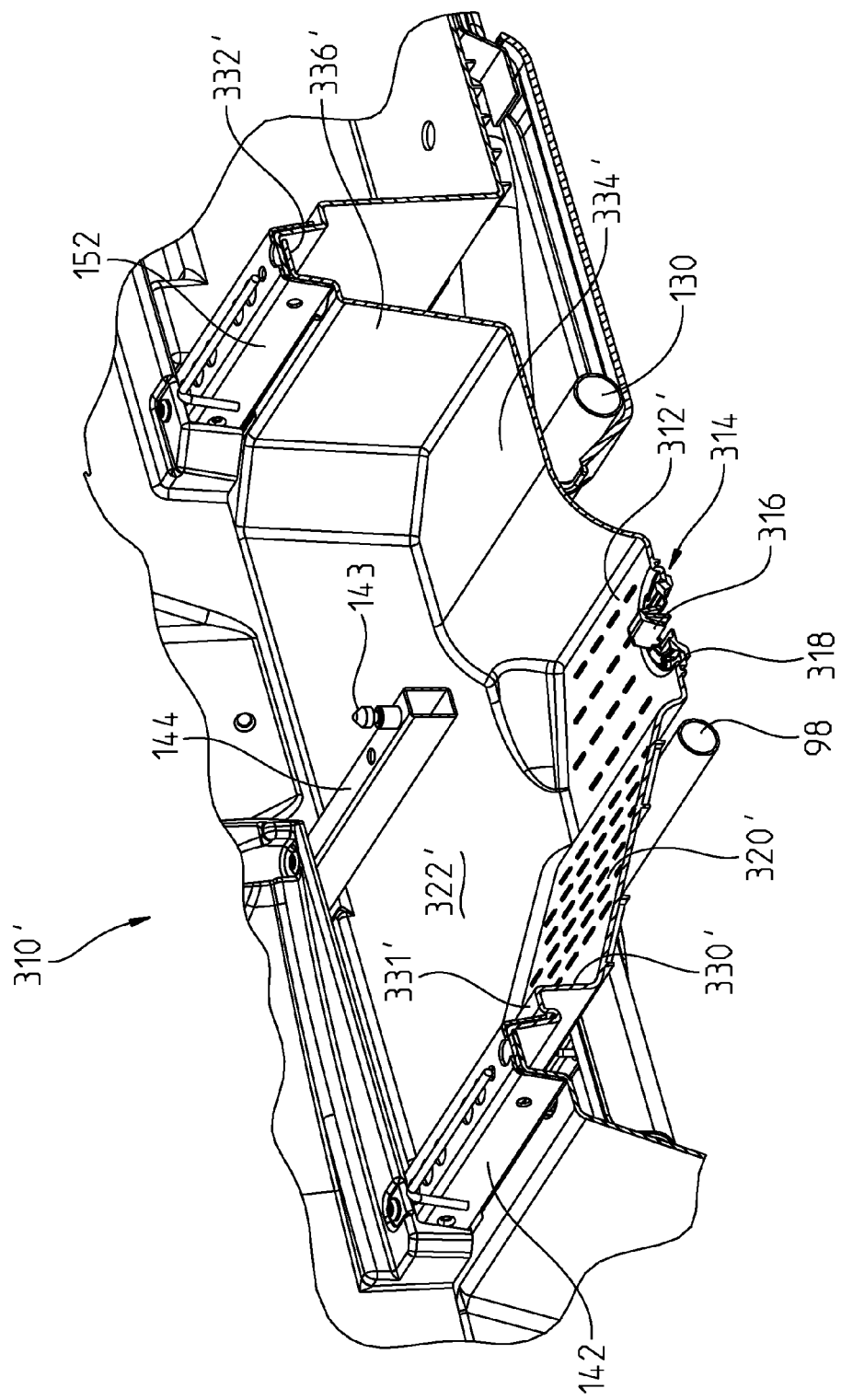
FIG. 35 is a left front cross-sectional view of the floorboard assembly of FIG. 34.

As shown in FIGS. 33-35, while seated on seats 270 in operator area 20, the rear passengers' feet may contact an alternative embodiment of floorboard assembly 310 of rear seating section 150, which is shown as floorboard assembly 310'. Floorboard assembly 310' includes a floorboard panel 312' and drain assembly 314.

Floorboard panel 312' of rear seating section 150 is integrally formed with, or otherwise coupled to, a front angled panel 320', a front vertical panel 330', a front planar panel 331', an inner side panel 322', an outer side panel 324', a rear rounded panel 334', and a rear vertical panel 336'. As shown in FIGS. 34 and 35, floorboard panel 312' is positioned below frame assembly 50. More particularly, floorboard panel 312' is positioned below the top surface of at least front longitudinally-extending frame members 58, cross members 98, and cross members 130 of frame assembly 50. Additionally, as shown in FIGS. 34 and 35, front angled panel 320', front planar panel 331', and front vertical panel 330' are positioned below seats 270 in front seating section 140 and, more particularly, are positioned intermediate seat rails 142 and 144 of front seating section 140. As such, the leg room for the rear passengers is increased because the rear passengers may extend their legs forward and under seats 270 in front seating section 140.

As shown in FIG. 35, front planar panel 331' includes a lip 338' which is positioned under seat rail 142 of front seating section 140 and is coupled thereto. As such, floorboard assembly 310' is coupled to front seating section 140. Similarly, rear vertical panel 336' includes a lip 332' which is positioned under seat rail 152 of rear seating section 150 in order to couple floorboard assembly 310' to rear seating section 150. Additionally, outer side panel 324' includes a lip 338', which extends over forward frame rail 88 and couples with an outer body panel, illustratively a rocker panel 374. Outer side panel 324' also includes a cut-out for accommodating coupling member 147. Inner side panel 322' is coupled to rear center console 39.

Front angled panel 320', front vertical panel 330', rear rounded panel 334', and rear vertical panel 336' are coupled to inner and outer side panels 322' and 324' to define a foot well for the rear passengers. Front angled panel 320' and rear rounded panel 334' are angled downwardly toward floorboard panel 312', which may facilitate cleaning floorboard assembly 310'. In other words, front angled panel 320' and rear rounded panel 334' are angled to direct dirt, debris, and liquids toward drain assembly 314. Additionally, the rounded and angled contour of front angled panel 320' is configured to provide a dead pedal-type foot rest for the rear passengers to increase the ergonomics and/or stability of the rear passengers. More particularly, front angled panel 320' may be angled by approximately 15-35 degrees from floorboard panel 312' to provide the rear passengers with a dead pedal and to angle debris, dirt, and fluids toward drain assembly 314. Illustratively, front angled panel 320' may be angled by approximately 23 degrees relative to floorboard panel 312'.

To enclose operator area 20, door assembly 350 is operably coupled to roll cage assembly 200 and frame assembly 50. Door assembly 350 is shown in FIGS. 33-37 and includes front doors 352, each having an outer cover 356 and a door frame 358, and rear doors 354, each having an outer cover 360 and a door frame 362. In one embodiment, door frames 358, 362 are stamped components. Front doors 352 close against front seating section 140 and rear doors close against rear seating section 150. Front doors 352 include a latch mechanism 364 that is supported on door frame 358 and bracket 122 of frame assembly 50.

Additionally, front doors 352 are configured to pivot or rotate between an open position and a closed position with hinge 236. Hinge 236 is coupled to forward upstanding members 220 of roll cage assembly 200. Hinge 236 also is coupled to door frame 358 with fasteners 372. As shown in FIG. 35, door frame 358 includes slotted apertures 359 which are larger than apertures 239 of hinges 236. As such, slotted apertures 359 allow the positioned of hinges 236 to be adjusted relative to door frame 358. The adjustability of hinges 236 on door frame 358 accommodates various tolerances between door assembly 350, roll cage assembly 200, and frame assembly 50. More particularly, the position of front doors 352 may be adjusted relative to hinges 236 without the need to remove outer cover 356.

Rear doors 354 include a latch mechanism 366 that is supported on door frame 362 and latch mounts 237. More particularly, as shown in FIG. 35, latch mechanism 366 includes a strike plate 367 with a strike bar 367a and adjustment apertures 367b. Strike plate 267 is coupled to latch mount 237 with fasteners 370. Adjustment apertures 367b may be oversized or slotted relative to strike bar 367a and/or fasteners 370 in order to allow for adjustment of strike bar 367a on strike plate 367 and/or adjustment of strike plate 367 on latch mount 237. In this way, door assembly 350 is adjustable to accommodate various sizes of doors, latches, and frame assemblies, as well as tolerances between the various components of door assembly 350, roll cage assembly 200, and frame assembly 50. Latch mechanism 364 of front doors 352 may be configured in the same manner as latch mechanism 366 of rear doors 354.

Rear doors 354 are configured to pivot or rotate between an open position and a closed position with a hinge 368 coupled to bolster bar 246 and door frame 362. Door frame 362 also may be configured with slotted apertures to allow the position of rear doors 354 to be adjusted relative to hinges 368 without needing to remove outer cover 360, in the same manner detailed above with respect to front doors 352.

Figure 36:
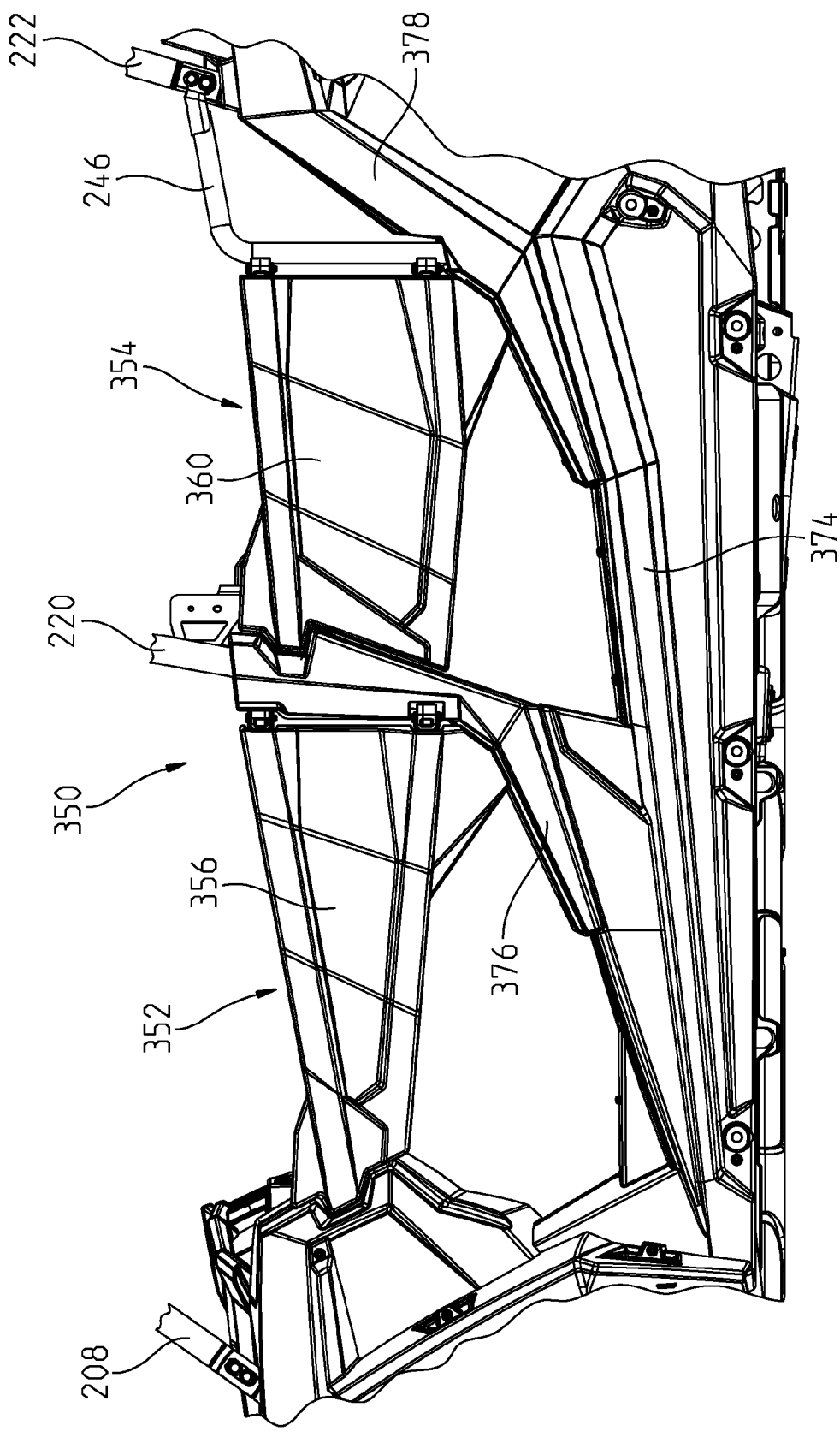
FIG. 36 is a left side view of a door assembly of the vehicle of FIG. 1.

Rocker panel 374 is supported on frame assembly 50 and/or forward upstanding members 220 of roll cage assembly 200 and is illustratively positioned below door assembly 350, as shown in FIGS. 33 and 36. A front panel 376 is coupled to rocker panel 374 and forward upstanding member 220. Front panel 376 may conceal a portion of hinges 236. Similarly, a rear panel 378 is coupled to rocker panel 374, rearward upstanding member 222, and/or bolster bar 246. Rear panel 378 is angled rearwardly to prevent interfering with ingress and egress for rear seating section 150. Additionally, rocker panel 374 includes a recess 375 that also increases the amount of space available for ingress and egress for rear seating section 150.

Figure 37:
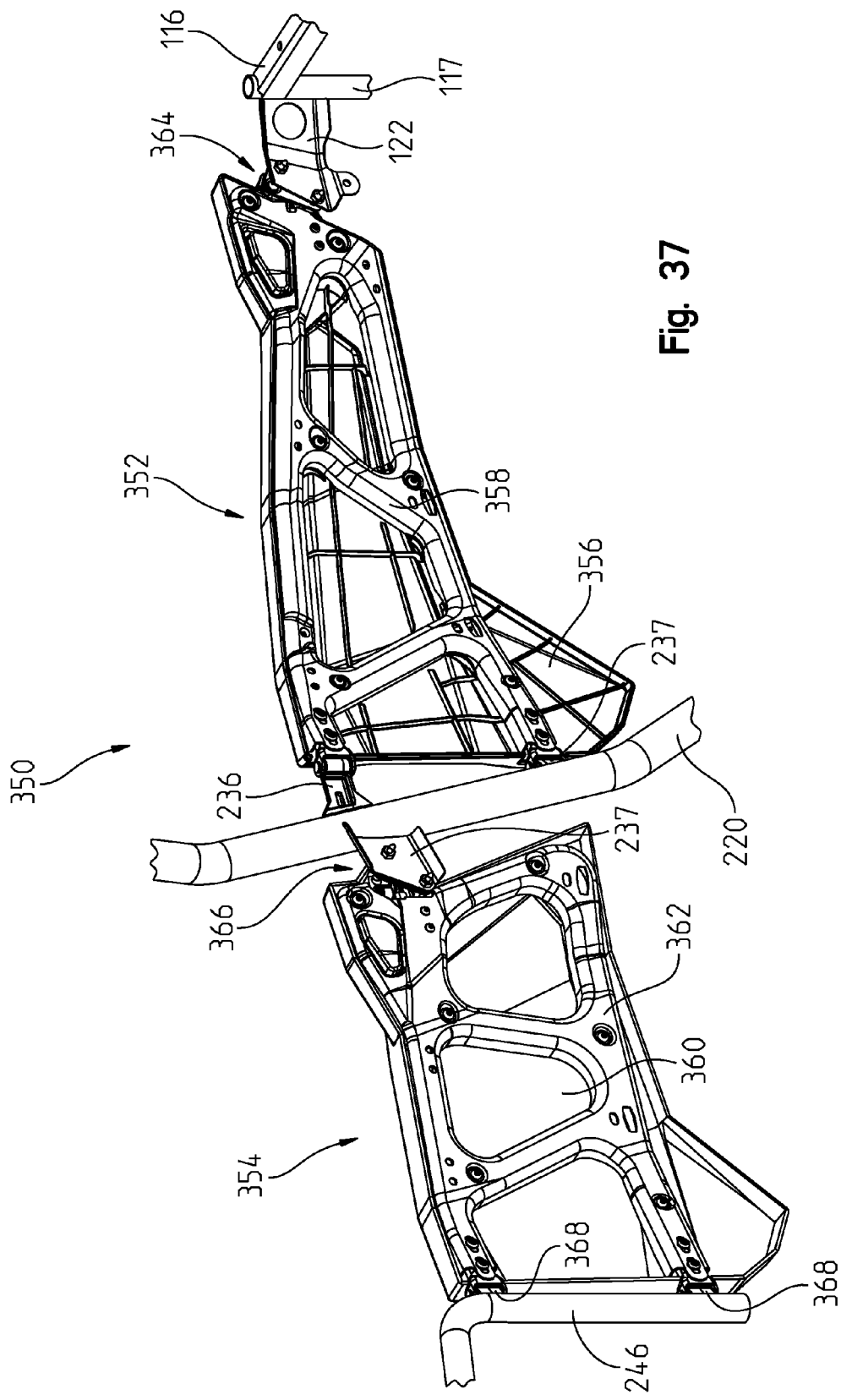
FIG. 37 is a right rear perspective view of the door assembly of FIG. 33.

As shown best in FIG. 37, front door 352 and rear door 354 of door assembly 350 extend laterally outwardly from frame assembly 50 and roll cage assembly 200. Illustratively, a portion of doors 352 and 354 bow outwardly to increase the arm space for the operator and passengers. As such, the operator and passengers are provided with additional space in operator area 20.

Referring to FIGS. 38 and 39, utility vehicle 2 also includes brake assembly 380. Brake assembly 380 includes a hub 381, brake discs 382, brake calipers 384, and braking fluid lines 385. Brake calipers 384 include brake pads 386 and a piston 388. Illustrative piston 388 may be stainless steel to decrease the amount of heat produced when stopping utility vehicle 2. Additionally, the thickness of brake disc 382 may be increased to decreased the amount of heat produced when stopping utility vehicle 2. In one embodiment, the thickness of brake discs 382 may increase by approximately 0.060 inches.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A utility vehicle, comprising:
a plurality of ground engaging members;
a frame supported by the plurality of ground engaging members;
a roll cage assembly coupled to the frame and positioned generally above the frame;
an operator area defined between the frame and the roll cage assembly; and
a door assembly including a front door and a rear door, the front and rear doors each being configured to rotate between a closed position and an open position, the front and rear doors being coupled to at least one of the roll cage assembly and the frame when in the closed position, and the position of the front and rear doors being adjustable in a fore/aft direction relative to the roll cage assembly when in the closed position.

2. The utility vehicle of claim 1, wherein the front door includes a door frame and an outer cover coupled to the door frame.

3. The utility vehicle of claim 2, wherein the door assembly further includes a hinge operably coupled to the front door and the roll cage assembly, the hinge includes at least one opening and the door frame includes at least one opening, and the opening of the door frame has a length greater than a length the opening of the hinge.

4. The utility vehicle of claim 3, wherein the position of the opening of the hinge is adjustable along the length of the opening of the door frame to adjust the position of the front door relative to the roll cage assembly.

5. The utility vehicle of claim 1, wherein the door assembly further comprises a latch mechanism operably coupled to the rear door, wherein the position of the latch mechanism relative to at least one of the rear door and the roll cage assembly is adjustable.

6. The utility vehicle of claim 1, wherein the door assembly extends outwardly from the operator area when in the closed position.

7. A utility vehicle, comprising:
a plurality of ground engaging members;
a frame supported by the plurality of ground engaging members;
a roll cage assembly coupled to the frame and positioned generally above the frame;
an operator area defined between the frame and the roll cage assembly; and
at least one door configured to rotate between a closed position and an open position, the door being coupled to at least one of the roll cage assembly and the frame when in the closed position, and the door including a door frame having a slotted aperture configured to adjust the position of the door relative to the roll cage assembly when in the closed position.

8. The utility vehicle of claim 7, wherein the slotted aperture extends longitudinally to adjust the position of the door in a fore/aft direction of the utility vehicle.

9. The utility vehicle of claim 7, further comprising at least one hinge coupled to the roll cage assembly and including an opening corresponding to a plurality of positions along the slotted aperture.

10. The utility vehicle of claim 7, wherein the at least one door includes a front door and a rear door, and each of the front and rear doors includes at least one slotted aperture.

11. The utility vehicle of claim 10, wherein at least the rear door includes a latch assembly coupled to the roll cage assembly and configured to adjust the position of the rear door relative to the door frame assembly when in the closed position.

12. The utility vehicle of claim 11, wherein the latch assembly includes a strike bar and a strike plate, the strike plate is configured to be received by a portion of the rear door and a position of the strike bar on the strike plate is adjustable.

* * * * *